(12) United States Patent
Hanai

(10) Patent No.: US 11,462,028 B2
(45) Date of Patent: *Oct. 4, 2022

(54) INFORMATION PROCESSING DEVICE AND INFORMATION PROCESSING METHOD TO GENERATE A VIRTUAL OBJECT IMAGE BASED ON CHANGE IN STATE OF OBJECT IN REAL SPACE

(71) Applicant: SONY CORPORATION, Tokyo (JP)

(72) Inventor: Yuya Hanai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,818

(22) Filed: Sep. 23, 2019

(65) Prior Publication Data

US 2020/0019755 A1 Jan. 16, 2020

Related U.S. Application Data

(63) Continuation of application No. 15/102,299, filed as application No. PCT/JP2014/076618 on Oct. 3, 2014, now Pat. No. 10,452,892.

(30) Foreign Application Priority Data

Dec. 17, 2013 (JP) .................................. 2013-260107

(51) Int. Cl.
*G06K 9/00* (2022.01)
*G06T 19/00* (2011.01)
(Continued)

(52) U.S. Cl.
CPC ............ *G06V 20/64* (2022.01); *G06T 19/006* (2013.01); *G06V 10/42* (2022.01); *G06V 20/20* (2022.01); *G06T 2207/10012* (2013.01)

(58) Field of Classification Search
None
See application file for complete search history.

(56) References Cited

U.S. PATENT DOCUMENTS 6,752,720 B1 6/2004 Clapper et al.
8,189,864 B2 5/2012 Kojo
(Continued)

FOREIGN PATENT DOCUMENTS

JP 2004-503307 A 2/2004
JP 2009-076060 A 4/2009
(Continued)

OTHER PUBLICATIONS

Csongei et al. (ClonAR: Rapid Redesign of Real-World Object and https://www.youtube.com/watch?v=Jb2LPB_IPOs) (Year: 2012).*
(Continued)

*Primary Examiner* — Randolph I Chu
(74) *Attorney, Agent, or Firm* — Chip Law Group

(57) ABSTRACT

To provide an information processing device, an information processing method, and a program that can give a user a stronger impression that a real world is enhanced by using an AR technique. The information processing device includes a recognition unit that recognizes an object included in a real space so as to distinguish the object from a background on the basis of three-dimensional data of the real space in order to generate a virtual object image obtained by changing a state of the object.

16 Claims, 15 Drawing Sheets

(51) Int. Cl.
*G06V 20/20* (2022.01)
*G06V 20/64* (2022.01)
*G06V 10/42* (2022.01)

(56) References Cited

U.S. PATENT DOCUMENTS

| | | | | |
|---|---|---|---|---|
| 10,452,892 B2* | 10/2019 | Hanai | | G06K 9/00671 |
| 2011/0007073 A1* | 1/2011 | Belt | | G06T 15/60 |
| | | | | 345/426 |
| 2011/0018990 A1* | 1/2011 | Komoto | | H04N 9/04557 |
| | | | | 348/208.99 |
| 2011/0096093 A1* | 4/2011 | Oi | | G06T 7/74 |
| | | | | 345/633 |
| 2012/0013915 A1* | 1/2012 | Okamura | | A61B 3/1025 |
| | | | | 356/213 |
| 2012/0223956 A1* | 9/2012 | Saito | | G06F 3/0481 |
| | | | | 382/284 |
| 2013/0060146 A1* | 3/2013 | Yang | | G01B 11/25 |
| | | | | 600/476 |
| 2013/0120365 A1* | 5/2013 | Lee | | G06F 3/011 |
| | | | | 345/419 |
| 2013/0135295 A1* | 5/2013 | Li | | H04N 13/156 |
| | | | | 345/419 |
| 2013/0194164 A1* | 8/2013 | Sugden | | G06F 3/013 |
| | | | | 345/8 |
| 2013/0194259 A1* | 8/2013 | Bennett | | G06T 19/006 |
| | | | | 345/420 |
| 2014/0002457 A1* | 1/2014 | Swindell | | G06T 19/20 |
| | | | | 345/426 |
| 2014/0044305 A1* | 2/2014 | Scavezze | | H04M 1/72409 |
| | | | | 382/103 |
| 2014/0125698 A1* | 5/2014 | Latta | | A63F 13/65 |
| | | | | 345/633 |
| 2014/0267012 A1* | 9/2014 | Mullins | | G06F 3/017 |
| | | | | 345/156 |
| 2014/0375683 A1* | 12/2014 | Salter | | G02B 27/0172 |
| | | | | 345/633 |
| 2015/0009124 A1* | 1/2015 | Antoniac | | G06F 3/017 |
| | | | | 345/156 |
| 2015/0091780 A1* | 4/2015 | Lyren | | G02B 27/017 |
| | | | | 345/8 |
| 2015/0091891 A1 | 4/2015 | Raheman et al. | | |
| 2015/0310041 A1* | 10/2015 | Kier | | G06F 16/5854 |
| | | | | 463/33 |
| 2015/0350618 A1* | 12/2015 | Meier | | G06T 7/80 |
| | | | | 345/7 |
| 2016/0187654 A1* | 6/2016 | Border | | G02B 27/0172 |
| | | | | 359/630 |
| 2016/0209648 A1* | 7/2016 | Haddick | | G04G 21/025 |
| 2016/0217623 A1* | 7/2016 | Singh | | G09G 3/003 |
| 2017/0092011 A1* | 3/2017 | Oikawa | | G06V 10/44 |
| 2017/0150136 A1* | 5/2017 | Ueno | | G06F 3/01 |
| 2017/0208437 A1* | 7/2017 | Yokoyama | | G06Q 10/10 |
| 2018/0286131 A1* | 10/2018 | Friesen | | G06T 19/006 |

FOREIGN PATENT DOCUMENTS

| | | |
|---|---|---|
| JP | 2012-141822 A | 7/2012 |
| WO | 2001/095988 A1 | 12/2001 |
| WO | 2013/027628 A1 | 2/2013 |

OTHER PUBLICATIONS

Cosco (Visuo-Haptic Mixed Reality with Unobstructed Tool-Hand Integration, https://www.youtube.com/watch?v=4I4gAW2LaiY, May 2012). (Year: 2012).*

Silva et al. "Introduction to Augmented Reality", 2003 (Year: 2003).*

Fronius, "Virtual Welding: Now also available for MMAW", https://www.youtube.com/watch?v=zNCalcajXf8, Sep. 10, 2013 (Year: 2013).*

AEL @ GT, "ARhrrrr—An augmented reality shooter", https://www.youtube.com/watch?v=cNu4CluFOcw , Jun. 11, 2009 (Year: 2009).*

Common Craft, "Augmented Reality—Explained by Common Craft", https://www.youtube.com/watch?v=D-A1I4Jn6EY, Jun. 10, 2010 (Year: 2010).*

Keiichi Matsuda, Augmented (hyper)Reality: Domestic Robocop, https://www.youtube.com/watch?v=fSfKICmYcLc, Jan. 6, 2010 (Year: 2010).*

CuriousInventor, Augmented Reality BreadBoard circuit building guide, https://www.youtube.com/watch?v=AfVQ4N-u0sk, Nov. 5, 2013 (Year: 2013).*

Scope AR, Scope Technologies Augmented Reality Training Pump Demo, https://www.youtube.com/watch?v=Q78GAM4a7nI, Dec. 18, 2012 (Year: 2012).*

Non-Final Office Action for U.S. Appl. No. 15/102,299, dated Aug. 17, 2017, 16 pages.

Non-Final Office Action for U.S. Appl. No. 15/102,299, dated Aug. 9, 2018, 15 pages.

Final Office Action for U.S. Appl. No. 15/102,299, dated Mar. 2, 2018, 13 pages.

Final Office Action for U.S. Appl. No. 15/102,299, dated Jan. 4, 2019, 13 pages.

Advisory Action for U.S. Appl. No. 15/102,299, dated May 25, 2018, 03 pages.

Advisory Action for U.S. Appl. No. 15/102,299, dated Mar. 14, 2019, 02 pages.

Notice of Allowance for U.S. Appl. No. 15/102,299, dated Jun. 19, 2019, 09 pages.

Shahzad Malik, "Robust Registration of Virtual Objects for Real-Time Augmented Reality", Carleton University, May 8, 2002, 93 pages.

Csongei, et al., "ClonAR: Rapid Redesign of Real-World Object", IEEE International Symposium on Mixed and Augmented Reality ( ISMAR), Jan. 7, 2013, 02 pages.

Csongei, et al., "ClonAR: Rapid Redesign of Real-World Object", Youtube, URL: https://www.youtube.com/watch?v=Jb2LPB_IPOs., 2012.

Cosco, et al., Visuo-Haptic Mixed Reality with Unobstructed Tool-Hand Integration, Youtube, URL: https://www.youtube.com/watch?v=4I4gAW2LaiY, May 2012.

International Search Report and Written Opinion of PCT Application No. PCT/JP2014/076618, dated Dec. 22, 2014, 06 pages of English Translation and 07 pages of ISRWO.

International Preliminary Report on Patentability of PCT Application No. PCT/JP2014/076618, dated Jun. 30, 2016, 07 pages of English Translation and 04 pages of IPRP.

* cited by examiner

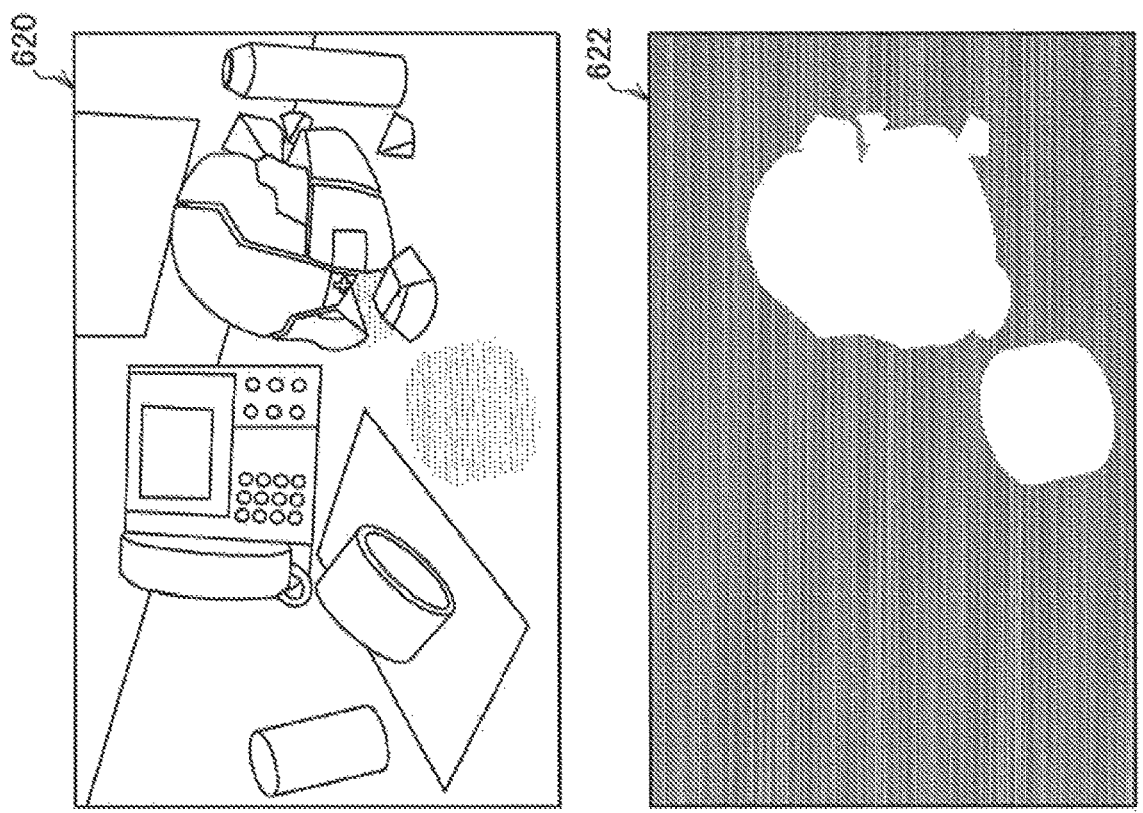
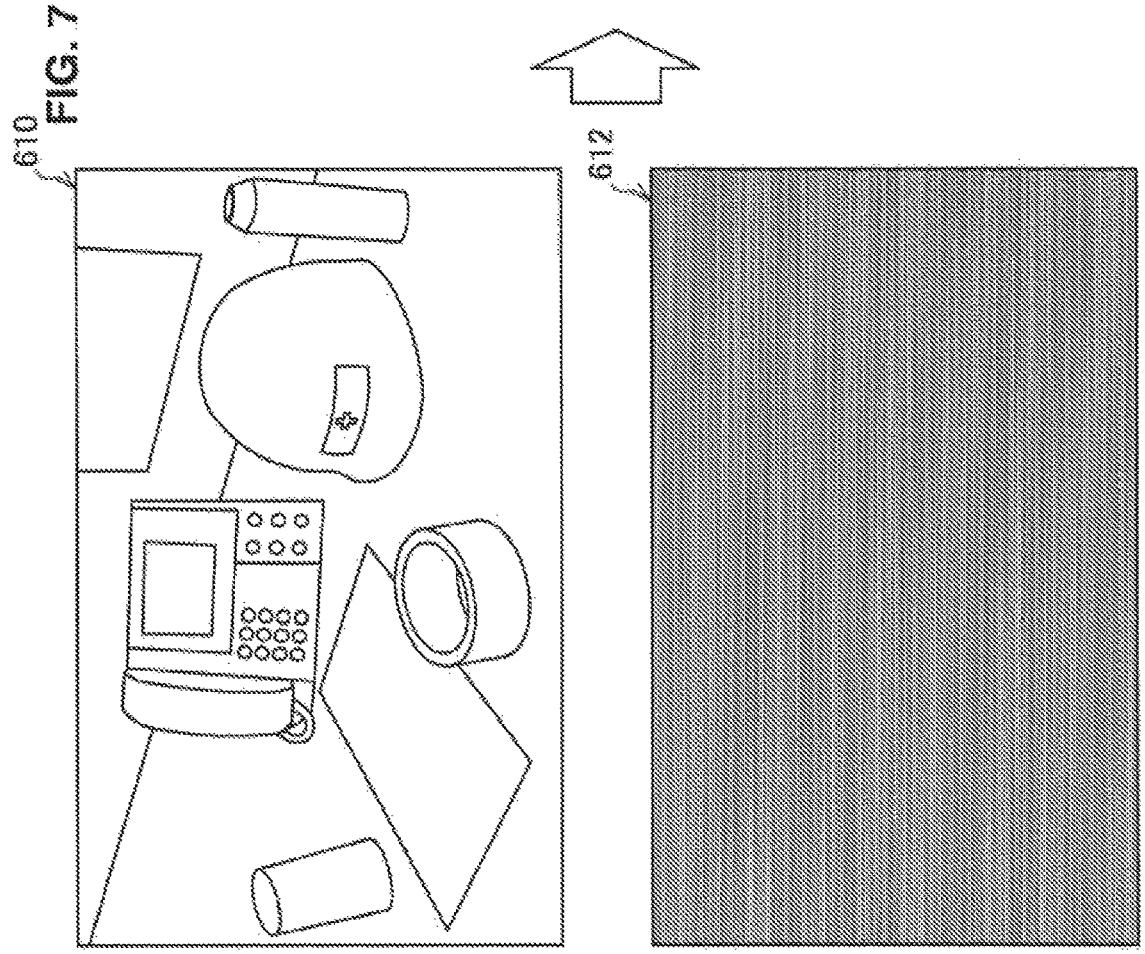
FIG. 7

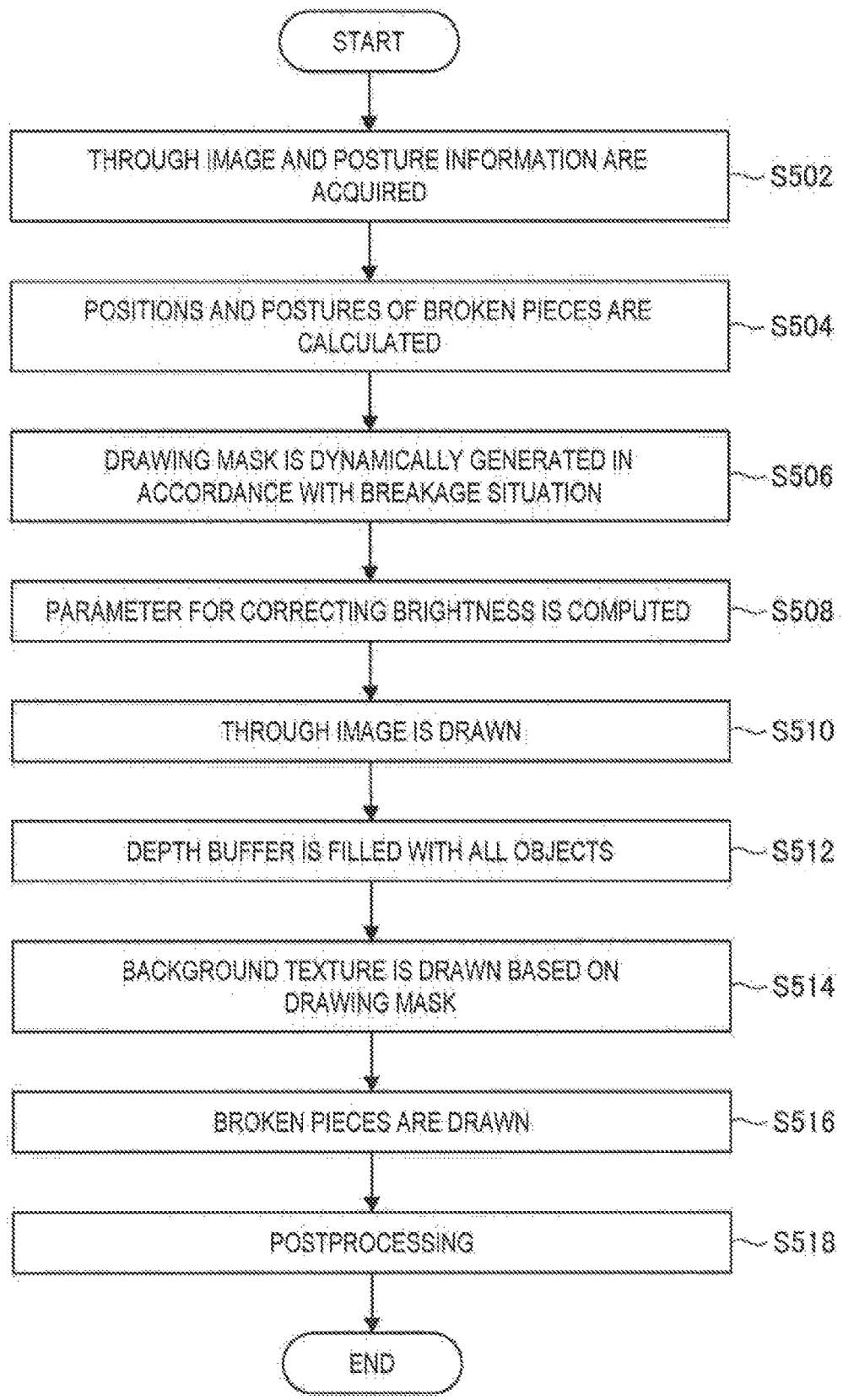

INFORMATION PROCESSING DEVICE AND INFORMATION PROCESSING METHOD TO GENERATE A VIRTUAL OBJECT IMAGE BASED ON CHANGE IN STATE OF OBJECT IN REAL SPACE

CROSS REFERENCE TO RELATED APPLICATIONS

The present application is a continuation application of U.S. patent application Ser. No. 15/102,299, filed Jun. 7, 2016, which is a national stage entry of PCT application No. PCT/JP2014/076618, filed Oct. 3, 2014, and claims priority from prior Japanese Priority Patent Application JP 2013-260107 filed Dec. 17, 2013, the entire contents of which are incorporated herein by reference.

TECHNICAL FIELD

The present disclosure relates to an information processing device, an information processing method, and a program.

BACKGROUND ART

In recent years, a technique called augmented reality (AR) that overlays additional information on a real space and presents the information to a user has drawn attention. The information presented to the user in the AR technique is visualized by using various forms of virtual objects such as text, icon, or animation. A virtual object is located in an AR space in accordance with a position of a real object to be associated therewith and can be moved, can collide, and can be deformed in the AR space, for example.

For example, Patent Literature 1 cited below discloses a technique for deforming a virtual object and a technique for moving a virtual object while determining collision with terrain expressed by a virtual object.

CITATION LIST

Patent Literature

Patent Literature 1:
JP 2012-141822A

SUMMARY OF INVENTION

Technical Problem

However, the techniques disclosed in Patent Literature 1 cited above only express changes in virtual objects such as deformation of a virtual object and interaction between virtual objects. In order to give a user a stronger impression that a real world is enhanced by using the AR technique, it is desirable to provide expression that changes an object in a real space.

Solution to Problem

According to the present disclosure, there is provided an information processing device including: a recognition unit configured to recognize an object included in a real space so as to distinguish the object from a background on the basis of three-dimensional data of the real space in order to generate a virtual object image obtained by changing a state of the object.

According to the present disclosure, there is provided an information processing method including: recognizing, by a processor, an object included in a real space so as to distinguish the object from a background on the basis of three-dimensional data of the real space in order to generate a virtual object image obtained by changing a state of the object.

According to the present disclosure, there is provided a program for causing a computer to function as: a recognition unit configured to recognize an object included in a real space so as to distinguish the object from a background on the basis of three-dimensional data of the real space in order to generate a virtual object image obtained by changing a state of the object.

Advantageous Effects of Invention

As described above, according to the present disclosure, it is possible to give a user a stronger impression that a real world is enhanced by using an AR technique. Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 7 is a diagram for explaining dynamic drawing mask generation processing caused by a state change in a target object.

FIG. 16 is a flowchart showing an example of a flow of AR display processing, which is executed in the smartphone according to this embodiment.

DESCRIPTION OF EMBODIMENTS

Figure 1:
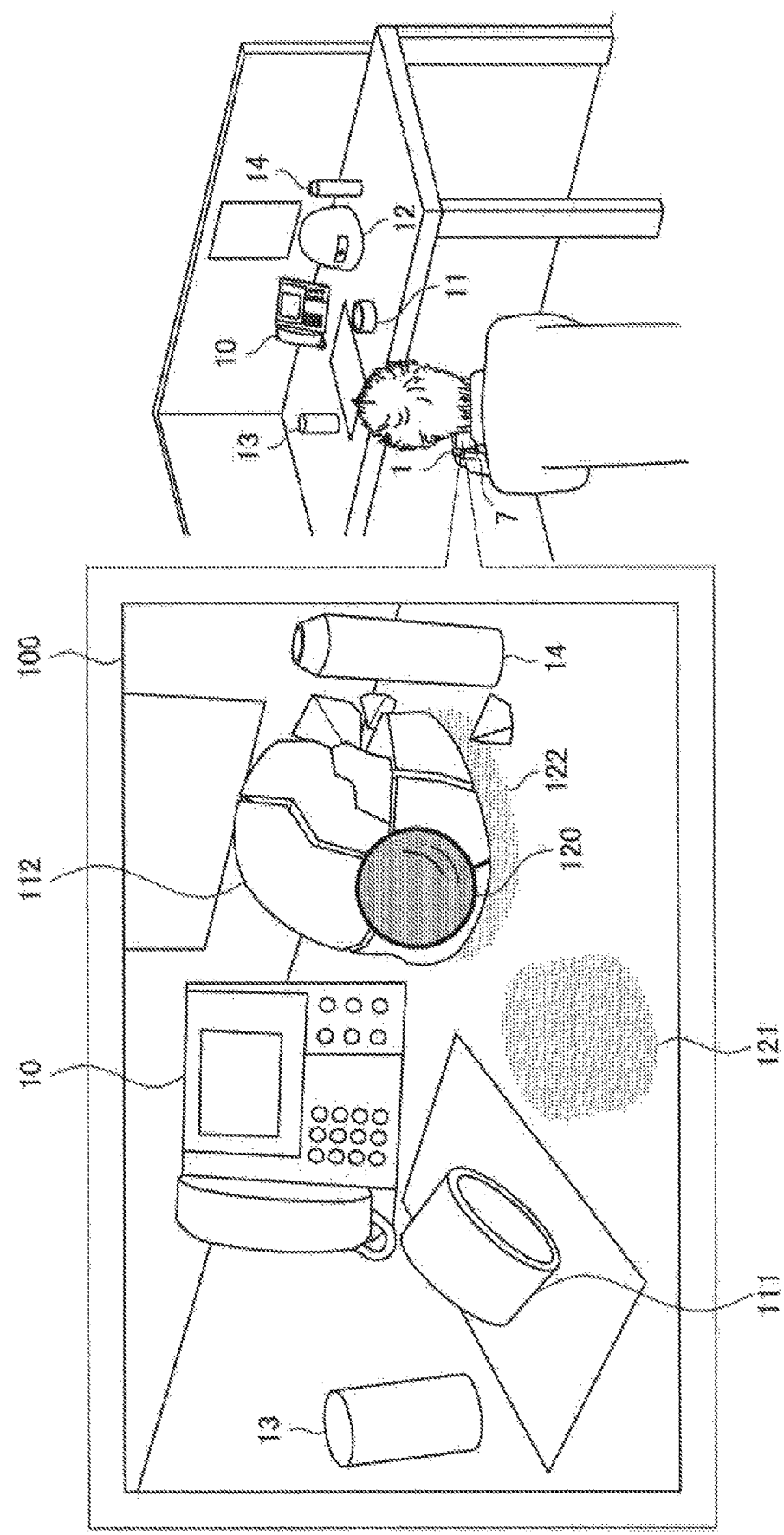
FIG. 1 is a diagram for explaining an overview of AR display processing according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Overview
2. Configuration Example of Smartphone
3. Operation Processing
3-1. Processing for Generating Change Object
3-2. Buffering Processing
3-3. Processing for Generating Background Texture
3-4. Processing for Generating Change Texture
3-5. AR Display Processing
4. Conclusion

1. OVERVIEW

An overview of AR display processing according to an embodiment of the present disclosure will be described with reference to FIG. 1.

FIG. 1 is a diagram for explaining an overview of AR display processing according to an embodiment of the present disclosure. As illustrated in FIG. 1, a user looks at a display unit 7 while holding a smartphone 1 in his hand, and an image pickup unit located on a back surface side of the display unit 7 is directed toward a desk. On the desk, a telephone set 10, a packing tape 11, a helmet 12, a beverage can 13, and a spray can 14 are placed. As indicated by a reference sign 100 in FIG. 1, the smartphone 1 according to this embodiment can perform display obtained by changing those objects placed on the desk in a real space.

As indicated by the reference sign 100 in FIG. 1, the smartphone 1 displays a state in which a ball 120, which is a virtual object, is thrown from the smartphone 1 and collides with an object on the desk to act the real space. Specifically, the smartphone 1 performs display by overlaying AR images 111 and 112 showing the flown packing tape 11 and the broken helmet 12 on a captured image obtained by capturing an image of the real space in real time. Further, the smartphone 1 performs display by overlaying AR images 121 and 122 showing backgrounds on respective regions where the packing tape 11 and the helmet 12 have originally been positioned, the regions being portions that are newly exposed due to moving or breakage. Although the telephone set 10, the beverage can 13, and the spray can 14 are real objects, the ball 120 does not collide with the telephone set 10, the beverage can 13, or the spray can 14. Therefore, as indicated by the reference sign 100 in FIG. 1, the smartphone 1 displays through images of the telephone set 10, the beverage can 13, and the spray can 14 as they are. Hereinafter, among the real objects, an object that is a target to be subjected to a state change, such as an object to be flown or broken, will be referred to as a target object, and an object other than the target object, such as a desk or a wall, will also be referred to as a background object. A captured image obtained by capturing an image of the real space in real time will also be referred to as a through image.

As first advance preparations for realizing such expression, first, the smartphone 1 acquires three-dimensional data of the real space. The three-dimensional data is data containing position information on apexes of an object in the real space, segments connecting the apexes, and a surface surrounded by the segments and is information that expresses a three-dimensional shape (surface) of the real space. By using this three-dimensional data, the smartphone 1 can display an AR image (object image) in an appropriate position and can express interaction such as collision between a virtual object and a real object.

As second advance preparations, the smartphone 1 collects images based on which an AR image related to a background object is generated and generates texture of a surface (surface image) of the background object. Specifically, first, regarding a portion corresponding to the background object among surfaces in the three-dimensional data, the smartphone 1 collects a captured image obtained by capturing an image of a region in the real space corresponding to the portion and buffers the captured image. For example, in the example illustrated in FIG. 1, in the case where there is only a captured image captured on a front side of the packing tape 11, a background object on a back surface side of the packing tape 11 is not captured because the background object is hidden. Therefore, the smartphone 1 buffers not only a captured image captured on the front side of the packing tape 11 but also a captured image captured on the back surface side of the packing tape 11. Then, the smartphone 1 combines the buffered captured images (buffer images), thereby generating an image of virtual texture (background texture) in which the target object does not exist.

As third advance preparations, the smartphone 1 generates texture based on which an AR image related to a target object is generated. Specifically, first, the smartphone 1 generates a virtual object (change object) obtained by changing a state of the target object and calculates a current position. For example, in the example illustrated in FIG. 1, the smartphone 1 generates three-dimensional data of a broken piece 112 of the helmet 12. Then, the smartphone 1 generates change texture to be displayed on a surface of the change object.

In the case where the AR display described above is executed, the smartphone 1 displays an AR image while dynamically masking a through image in accordance with a change in a state of an object such as breakage or move. Specifically, first, the smartphone 1 calculates a state change in the change object generated as advance preparations and dynamically determines a current position of the change object in the through image. For example, in the example illustrated in FIG. 1, a current position of the flown packing tape 111 and a current position of the broken piece 112 of the helmet 12 are calculated. Then, the smartphone 1 generates a drawing mask that transmits, in the through image, a region for performing display different from the real space at the time of AR display. For example, regarding the packing tape 11 illustrated in FIG. 1, there is generated a drawing mask that transmits a background that is newly exposed because the packing tape 11 is flown and a region for displaying the flown packing tape 11. Then, the smartphone 1 displays texture corresponding to such regions transmitted in the drawing mask.

Regarding an AR image of a background object, the smartphone 1 displays background texture generated in advance preparations on a surface of the background object by using a drawing mask. For example, in the example illustrated in FIG. 1, the corresponding region 121 of the background texture is displayed in the background region that is newly exposed because the packing tape 11 is flown. In this way, the smartphone 1 can display a natural background in a region that is newly exposed due to a state change in a target object.

Regarding an AR image of a target object, the smartphone 1 displays change texture generated in advance preparations on a surface of a change object. However, in order to express a state change in the target object more naturally, the smartphone 1 attaches, to portions of surfaces of the change object which are exposed in a through image, a corresponding region in the through image and attaches change texture to other regions. For example, in the example illustrated in FIG. 1, because a circumferential portion of the packing tape 11 is exposed, the smartphone 1 displays the circumferential portion by attaching an image of the circumferential portion in the through image to the circumferential portion of the flown packing tape 111. Meanwhile, because, for example, inside of the helmet 12 is hidden, the smartphone 1 displays change texture generated in advance preparations in a broken cross-section of the broken piece 112. In this way, the smartphone 1 can express more naturally a target object whose state has been changed.

Note that, although FIG. 1 illustrates an example where an information processing device according to an embodiment of the present disclosure is realized as the smartphone 1, a technique according to the present disclosure is not limited thereto. For example, the information processing device may be a head mounted display (HMD), a digital camera, a digital video camera, a tablet terminal, a mobile phone terminal, or the like. In the case where the information processing device is realized as an HMD, the HMD may perform display by overlaying an AR image on a through image captured by a camera or may display an AR image on a display unit formed in a transparent or semitransparent through state.

The overview of the AR display processing according to this embodiment has been described above. Next, a configuration of the smartphone 1 according to this embodiment will be described with reference to FIG. 2 to FIG. 11.

2. CONFIGURATION EXAMPLE OF SMARTPHONE

Figure 2:
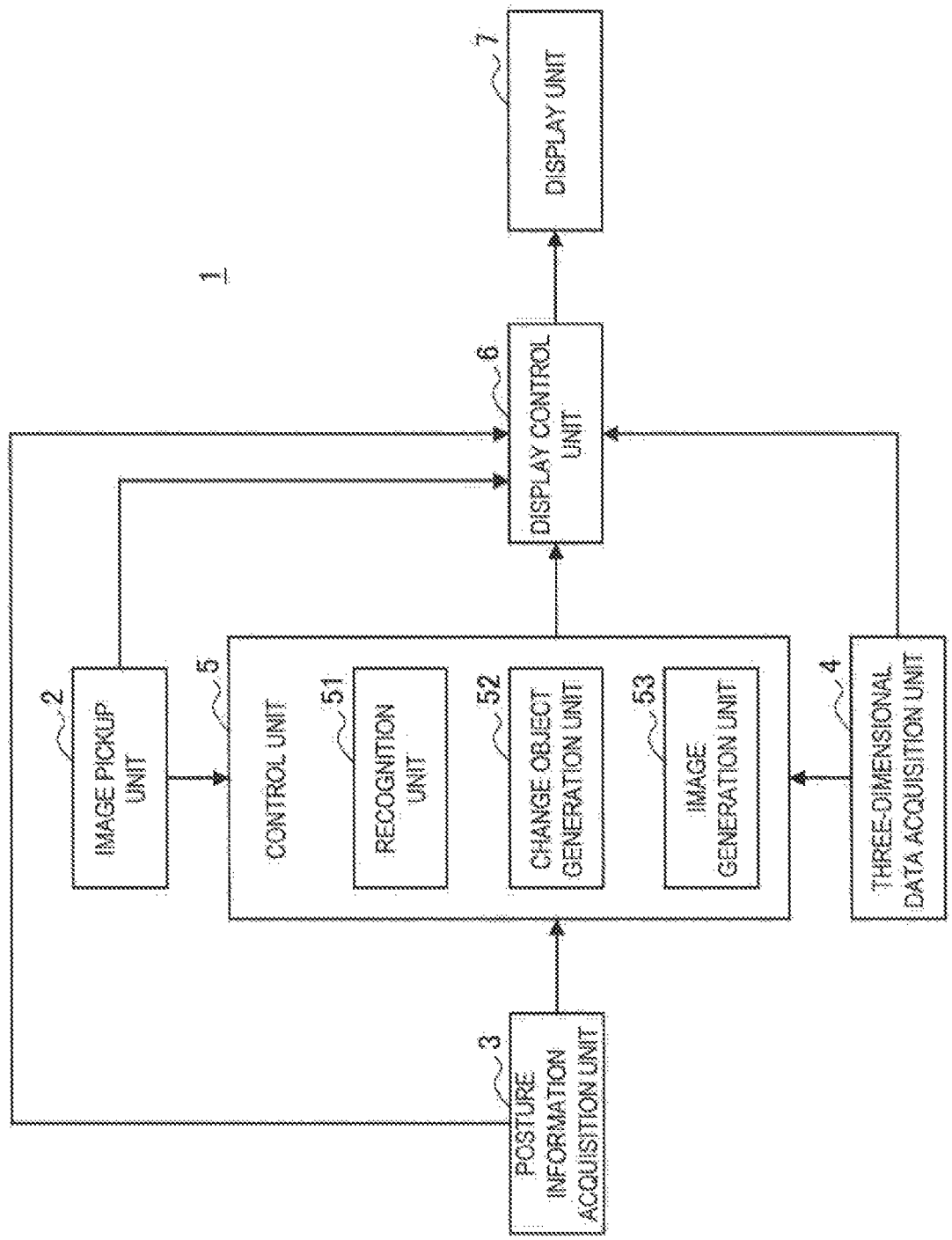
FIG. 2 is a block diagram showing an example of a configuration of a smartphone according to this embodiment.

FIG. 2 is a block diagram showing an example of a configuration of the smartphone 1 according to this embodiment. As shown in FIG. 2, the smartphone 1 includes an image pickup unit 2, a posture information acquisition unit 3, a three-dimensional data acquisition unit 4, a control unit 5, a display control unit 6, and the display unit 7.
(1) Image Pickup Unit 2

The image pickup unit 2 includes, for example, a lens system including an image pickup lens, a diaphragm, a zoom lens, and a focus lens, and the like, a drive system for causing the lens system to perform focusing operation and zooming operation, and a solid-state image pickup element array for performing photoelectric conversion on image pickup light obtained in the lens system and generating an image pickup signal. The solid-state image pickup element array may be realized by, for example, a charge coupled device (CCD) sensor array or a complementary metal oxide semiconductor (CMOS) sensor array. The image pickup unit 2 may be a single-lens camera or a stereo camera. A captured image captured by the single-lens camera or the stereo camera may be used to generate texture with the use of an image generation unit 53 described below or may be used to generate dynamic three-dimensional data with the use of the three-dimensional data acquisition unit 4.

The image pickup unit 2 according to this embodiment has a function of capturing an image of the real space to acquire an image used to generate texture with the use of a change object generation unit 52 described below. The image pickup unit 2 also has a function of acquiring a through image obtained by capturing an image of the real space in real time. The image pickup unit 2 outputs the captured images to the control unit 5 and the display control unit 6.
(2) Posture Information Acquisition Unit 3

The posture information acquisition unit 3 has a function of acquiring posture information indicating a position and an angle (posture) of the smartphone 1. The posture information acquisition unit 3 particularly acquires posture information on the image pickup unit 2. In order to present truly useful information to a user in an AR technique, it is important that a computer accurately grasp a situation of the real space. Therefore, a technique for grasping a situation of the real space, which is a basis of the AR technique, has been developed. One of such techniques is, for example, a technique called simultaneous localization and mapping (SLAM) capable of simultaneously estimating a position and a posture of a camera and a position of a feature point existing in an image of the camera. Basic principles of the SLAM technique using a single-lens camera are described in "Andrew J. Davison, "Real-Time Simultaneous Localization and Mapping with a Single Camera", Proceedings of the 9th IEEE International Conference on Computer Vision Volume 2, 2003, pp. 1403-1410". Note that, in particular, a SLAM technique for visually estimating a position by using a camera image is also referred to as visual SLAM (VSLAM). In the SLAM technique, a position and a posture of a camera are estimated by using an environment map and a camera image. In the case where, for example, the SLAM technique is used, the posture information acquisition unit 3 can accurately position polygon information for forming a shape of an object with respect to a real object by matching an environment map with a three-dimensional position of a feature point belonging to the object. The posture information acquisition unit 3 acquires posture information on the image pickup unit 2 on the basis of a result of this positioning. In addition, the posture information acquisition unit 3 may acquire posture information on the image pickup unit 2 by using a posture estimation technique using a marker, a technique called Dense Tracking and Mapping in Real-Time (DTAM), or a technique called Kinect Fusion. The posture information acquisition unit 3 may also acquire posture information on the basis of information detected by an acceleration sensor, an angular velocity (gyro) sensor, and a geomagnetic sensor. The posture information acquisition unit 3 outputs the acquired posture information to the control unit 5 and the display control unit 6.
(3) Three-Dimensional Data Acquisition Unit 4

The three-dimensional data acquisition unit 4 has a function of acquiring three-dimensional data of the real space. The three-dimensional data can be prepared by, for example, a single-lens image pickup sensor, a multiple-lens image pickup sensor, or a shape sensor using infrared rays. The three-dimensional data acquisition unit 4 may generate three-dimensional data by using the image pickup unit 2 or the shape sensor (not shown) using infrared rays and the posture information acquisition unit 3 or may acquire, from an external device, three-dimensional data generated in another terminal in advance. The three-dimensional data is realized as, for example, computer assisted drafting (CAD)

data. The three-dimensional data acquisition unit 4 outputs the acquired three-dimensional data to the control unit 5 and the display control unit 6.

(4) Control Unit 5

The control unit 5 functions as an arithmetic processing unit and a control device and controls whole operation in the smartphone 1 in accordance with various kinds of programs. The control unit 5 is realized by, for example, an electronic circuit such as a central processing unit (CPU) or a microprocessor. Note that the control unit 5 may include a read only memory (ROM) for storing programs, calculation parameters, and the like to be used and a random access memory (RAM) for temporarily storing parameters and the like which are changed as appropriate. As shown in FIG. 2, the control unit 5 functions as a recognition unit 51, the change object generation unit 52, and the image generation unit 53.

(4-1) Recognition Unit 51

The recognition unit 51 has a function of recognizing a target object included in the real space so as to distinguish the target object from a background object on the basis of the three-dimensional data of the real space acquired by the three-dimensional data acquisition unit 4. For example, assuming that the three-dimensional data indicates an artificial object (for example, a structure of an interior of a room), the recognition unit 51 recognizes a floor surface (dominant plane) and a wall surface from the three-dimensional data. Then, the recognition unit 51 recognizes, as the target object, a three-dimensional shape other than the floor surface or the wall surface, the three-dimensional shape being protruded on the floor surface and having a volume equal to or larger than a threshold. Note that, for example, a portion of the recognized target object, which has originally been in contact with the floor surface or the wall surface, can be a missing portion (hole) because the portion is not registered as a surface in the three-dimensional data. Therefore, the recognition unit 51 interpolates the missing portion by extending apexes around the missing portion, connecting the apexes around the missing portion with lines, or compensating a surface. In addition, the recognition unit 51 may interpolate the missing portion by using a preexisting algorithm. With this, it is possible to calculate a volume because manifoldness of the target object is secured. Therefore, the recognition unit 51 can appropriately recognize the target object. The target object recognized by the recognition unit 51 is a target to be used for generating a change object with the use of the change object generation unit 52 described below. Among three-dimensional shapes indicated by the three-dimensional data, the recognition unit 51 recognizes a three-dimensional shape other than the target object as a background object. The background object recognized by the recognition unit 51 so as to be distinguished from the target object is excluded from targets to be used for generating change objects with the use of the change object generation unit 52 described below. The recognition unit 51 may interpolate a missing portion of the background object in the same way as the missing portion of the target object. Hereinafter, processing for recognizing a target object with the use of the recognition unit 51 will be described with reference to FIG. 3.

Figure 3:
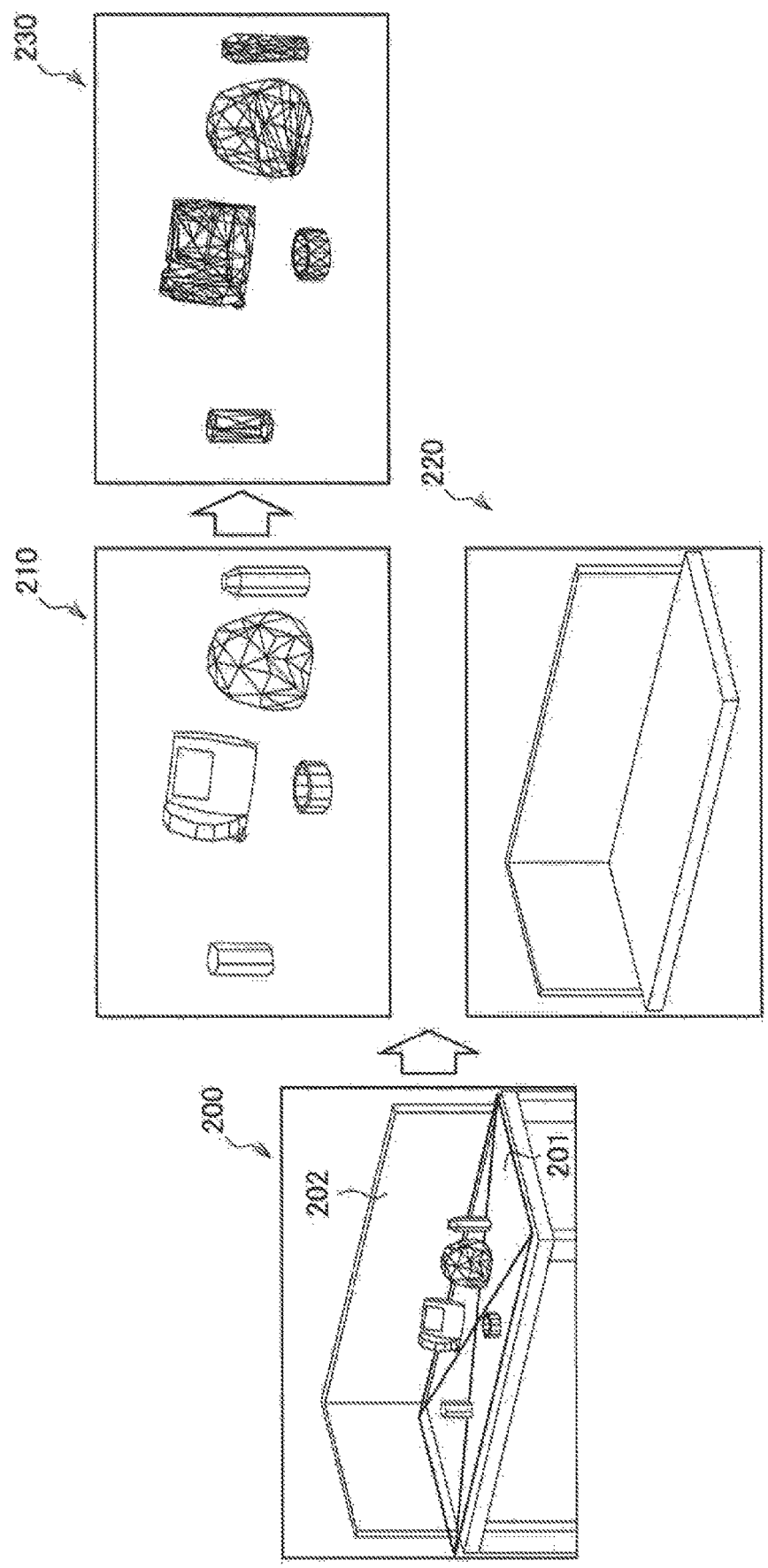
FIG. 3 is a diagram for explaining processing for recognizing a target object.

FIG. 3 is a diagram for explaining processing for recognizing a target object. Herein, it is assumed that three-dimensional data indicated by a reference sign 200 in FIG. 3 is acquired by the three-dimensional data acquisition unit 4. The recognition unit 51 extracts planes from the three-dimensional data 200 and recognizes a plane 201 having the largest area as a floor surface. At this time, the recognition unit 51 may extract the floor surface 201 on the basis of a direction of gravity detected by an acceleration sensor of a terminal that has acquired the three-dimensional data 200. In the case where the three-dimensional data 200 is generated by the three-dimensional data acquisition unit 4, the floor surface 201 is extracted on the basis of the direction of gravity detected by the acceleration sensor at the time of generation of the data. The use of the direction of gravity improves floor surface extraction accuracy. Note that it is expected that, in the case where the three-dimensional data indicates shapes in nature, a floor surface (ground) is rough, and therefore the recognition unit 51 may extract the floor surface by using a moderate gradient threshold. Further, the recognition unit 51 recognizes a wall surface 202 from objects mounted on the floor surface. For example, the recognition unit 51 defines a rectangle (axis aligned boundary box) and recognizes, as the wall surface 202, a shape group that is vertical to the floor surface and is provided in an end portion of the three-dimensional shape indicated by the three-dimensional data. With the processing described above, the recognition unit 51 recognizes the target object 210 and a background object 220 other than the target object so as to separate the target object 210 from the background object 220.

(4-2) Change Object Generation Unit 52

The change object generation unit 52 has a function of generating a change object obtained by changing a state of a target object recognized by the recognition unit 51. Specifically, the change object generation unit 52 generates data containing position information on apexes of the change object, segments connecting the apexes, and a surface surrounded by the segments. The change object may be, for example, broken pieces obtained by breaking the target object or may be a target object with an uneven surface. For example, the change object generation unit 52 generates a change object indicating broken pieces by applying an algorithm such as Voronoi Fracture or Voronoi Shatter to the target object. Hereinafter, processing for generating a change object with the use of the change object generation unit 52 will be described with reference to FIG. 3 again.

As illustrated in FIG. 3, the change object generation unit 52 forms a broken cross-section generated due to breakage on the target object 210 recognized by the recognition unit 51 and divides the target object into a plurality of pieces, thereby generating a change object 230 indicating broken pieces. At this time, the change object generation unit 52 sets flag information indicating whether or not a surface of each of the broken pieces is a surface of the target object before the target object is broken. This flag information is referred to when the broken pieces are drawn by the display control unit 6 described below.

(4-3) Image Generation Unit 53

The image generation unit 53 has a function of generating, in advance, texture based on which an AR image is generated as advance preparations for AR display. Specifically, the image generation unit 53 generates a virtual object image of a background object recognized by the recognition unit 51, i.e., texture (background texture) to be displayed on a surface of the background object which is newly exposed due to a state change. The image generation unit 53 also generates a virtual object image obtained by changing a state of a target object recognized by the recognition unit 51, i.e., texture (change texture) to be displayed on a surface of a change object generated by the change object generation unit 52. The image generation unit 53 generates texture on the basis of, for example, a captured image obtained by capturing an image of the real space with the use of the image pickup unit 2.

(4-3-1) Generation of Background Texture

Figure 4:
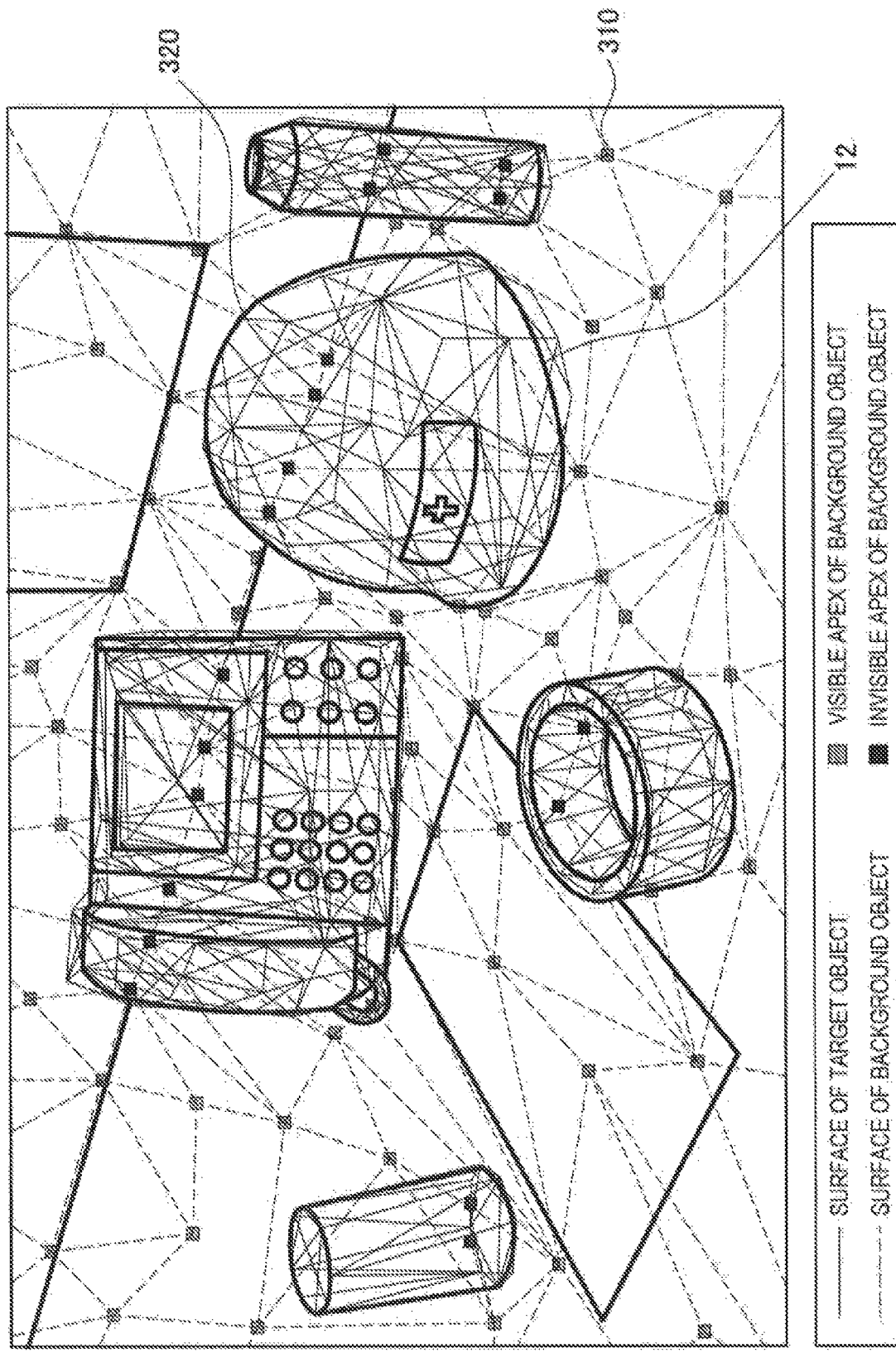
FIG. 4 is an explanatory view for explaining processing for generating background texture.

The image generation unit 53 combines background parts exposed in one or more captured images obtained by capturing images of the real space, thereby generating background texture (first surface image) to be displayed on a surface of a background object. Specifically, the image generation unit 53 collects images corresponding to a background object from the one or more captured images and combines the images by using, as a minimum unit, a region (hereinafter, also referred to as a polygon) divided by segments connecting apexes in three-dimensional data, thereby generating an image of the background texture. FIG. 4 is an explanatory view for explaining processing for generating background texture. FIG. 4 shows correspondence between a captured image of the real space and three-dimensional data. In FIG. 4, surfaces of target objects are shown as polygons surrounded by solid lines, and surfaces of the background object are shown as polygons surrounded by broken lines. The image generation unit 53 generates the background texture by collecting, from one or more captured images, images corresponding to the polygons of the background object indicated by the broken lines in FIG. 4 and combining the images.

The image generation unit 53 buffers a plurality of captured images captured by the image pickup unit 2 and forms background texture by combining one or more buffered buffer images. At the time of buffering, the image generation unit 53 preferentially buffers a captured image having high independence. High independence means that an overlapped portion where background is hidden by target objects is small. With this, the image generation unit 53 can generate background texture having more polygons with fewer images, and therefore the number of seams generated at the time of combination is reduced. Thus, more natural AR display is realized. The image generation unit 53 preferentially buffers a captured image captured recently. With this, the image generation unit 53 can generate background texture with a captured image captured more recently. This reduces a difference between a time at which a buffer image based on which an AR image is generated is captured and a time at which a through image is captured. Thus, more natural AR display is realized. Note that, in the present specification, description will be provided assuming that the image generation unit 53 generates background texture with the use of a plurality of buffer images, but a technique according to the present disclosure is not limited thereto. For example, the image generation unit 53 may generate change texture described below by using a plurality of buffer images. In addition, the image generation unit 53 may generate arbitrary texture related to a real object by using a plurality of buffer images.

The image generation unit 53 determines independence for each apex. Specifically, the image generation unit 53 performs buffering so as to visualize apexes of the background object as much as possible. For example, the image generation unit 53 determines invisible apexes and visible apexes of the background object and performs buffering so that all apexes become visible apexes in any captured image. Because visibility is determined for each apex, the determination number is reduced and a calculation amount is reduced, as compared with the case where visibility is determined for each pixel. Note that, among the apexes in the three-dimensional data, the visible apex is an apex whose corresponding position in a captured image is exposed.

Meanwhile, among the apexes in the three-dimensional data, the invisible apex is an apex whose corresponding position in a captured image is hidden. For example, in the example illustrated in FIG. 4, apexes 310 in front of the helmet 12 are visible apexes, and hidden apexes 320 behind the helmet 12 are invisible apexes. As a matter of course, the image generation unit 53 may determine visibility for each pixel when machine power is increased.

Figure 5:
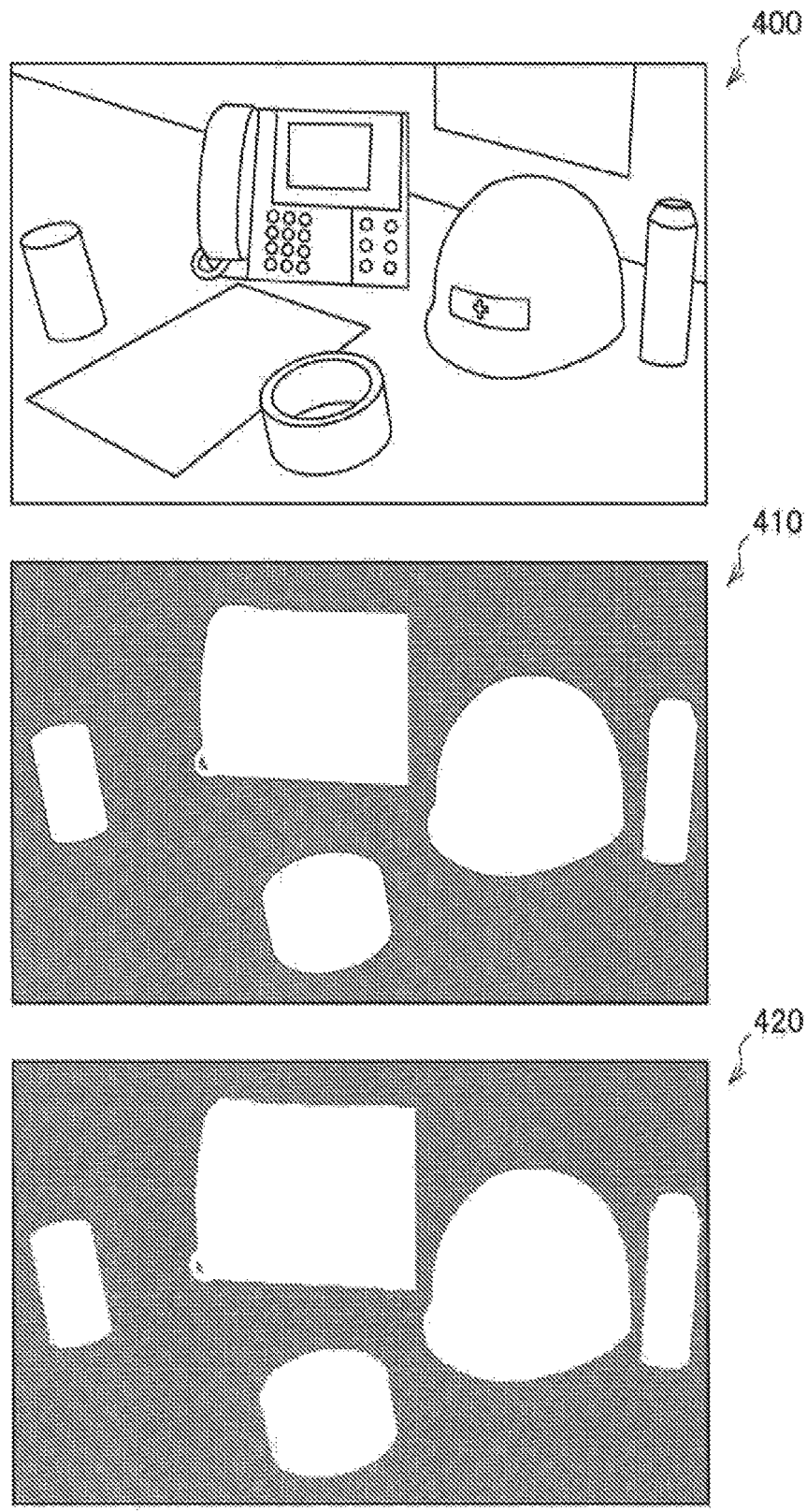
FIG. 5 is an explanatory view for explaining processing for generating background texture.

The image generation unit 53 calculates which position at which angle in the real space the image pickup unit 2 captures an image by using posture information acquired by the posture information acquisition unit 3 and the three-dimensional data, thereby determining visibility of an apex in a captured image and determining whether to perform buffering. FIG. 5 is an explanatory view for explaining processing for generating background texture. As illustrated in FIG. 5, the image generation unit 53 dynamically calculates apex positions of target objects by using the posture information and the three-dimensional data and generates a mask 410 that transmits regions of the target objects in a captured image 400. Then, the image generation unit 53 determines apexes included in the regions transmitted in the mask 410 as invisible apexes and determines other apexes as visible apexes. Note that the image generation unit 53 may determine visibility of apexes by using a mask 420 obtained by two-dimensionally increasing the transmission regions in the mask 410 instead of using the mask 410. In this case, apexes in a wider range are determined as invisible apexes, and therefore a posture estimation error of the posture information acquisition unit 3 is corrected. This prevents erroneous determination, i.e., prevents an invisible apex from being erroneously determined as a visible apex.

As described above, the image generation unit 53 generates an image of background texture by combining one or more buffer images. The image generation unit 53 preferentially combines captured images having a large visible area. More specifically, the image generation unit 53 combines buffer images so that a region obtained by combining the captured images having a large visible area occupies a larger region in the background texture. With this, the background texture is generated with fewer captured images, and therefore more unified and natural AR display is realized. Note that the image generation unit 53 may determine that a visible area is large in the case where the number of visible apexes are large and may determine that a visible area is small in the case where the number of visible apexes is small.

In the background object, a polygon invisible in all buffer images, such as a floor surface that is in contact with a target object, can be a blank missing portion in combined background texture. Therefore, the image generation unit 53 may interpolate the missing portion in the background texture by using an image interpolation algorithm such as Inpainting. Note that, in the background texture, a region obtained by combining the buffer images will be referred to as background texture in a visible region, whereas a region interpolated by using the image interpolation algorithm such as Inpainting will be referred to as background texture in an invisible region.

Figure 6:
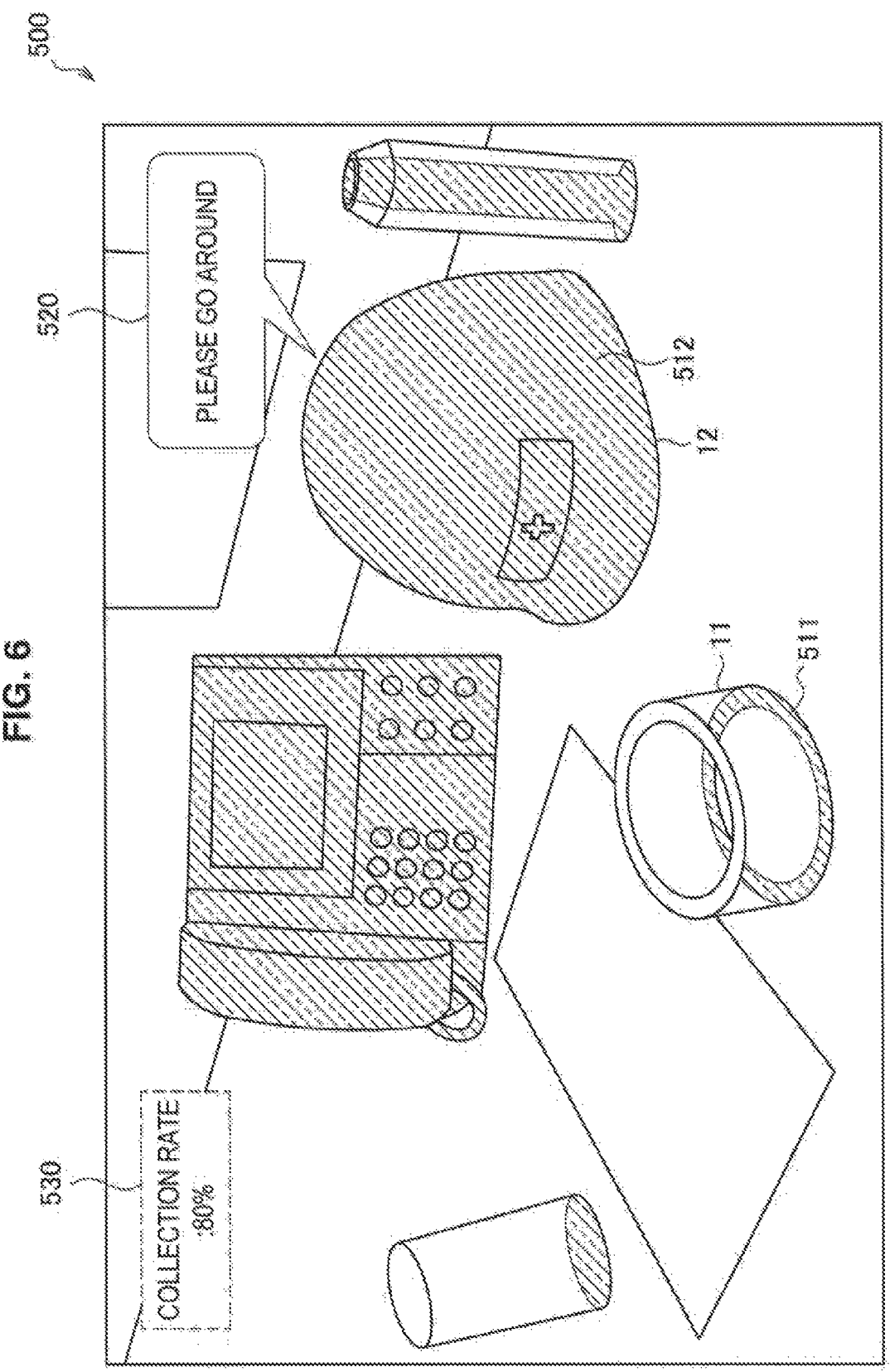
FIG. 6 illustrates an example of a UI for generating background texture.

The smartphone 1 may provide a user interface (UI) for buffering a captured image having high independence. For example, the smartphone 1 displays a UI for leading the image pickup unit 2 so that a whole region of a portion corresponding to a background among surfaces of a solid body indicated by the three-dimensional data is exposed in at least one of one or more buffered captured images. Specifically, the smartphone 1 leads a user so that all apexes in the background in the three-dimensional data are visible apexes in any buffered captured image. FIG. 6 illustrates an example of a UI for generating background texture. A UI 500 illustrated in FIG. 6 shows, for example, display 512 showing that a back surface of the helmet 12 and a surface thereof which is in contact with a floor are not included in buffered captured images. Therefore, the UI 500 shows display 520 for leading capturing of an image from a back surface side of the helmet 12. In the case where a captured image obtained by capturing the packing tape 11 from a background side of the packing tape 11 has already been buffered, the UI shows a display 511 showing that a surface of the packing tape 11 which is in contact with the floor is not included in the buffered captured images. Further, the smartphone 1 may perform buffering while giving a feeling that a user plays a game by displaying display 530 showing a collection rate. Such display of the UI is performed by the display control unit 6 described below.

An environmental change occurs in the real space as time passes, for example, and a plurality of buffered images have different brightness values in some cases. In view of this, at the time of buffering or at the time of generation of texture, the image generation unit 53 records brightness values near positions corresponding to apexes in the three-dimensional data, the positions being in a background exposed in the buffered captured images. The display control unit 6 described below compares the brightness values so that the images are matched with a through image, thereby correcting a brightness value of the texture. Therefore, more natural AR display is realized. In order to improve accuracy of correction, the image generation unit 53 may record a plurality of brightness values associated with apexes as distribution of brightness values. Among the visible apexes, the image generation unit 53 records only pixel values of visible apexes of a background object near a position in which background texture is displayed, i.e., near a target object. This reduces the number of times of comparison of brightness values, which is performed by the display control unit 6 described below to take matching, and accuracy of correction of brightness values is improved. As a matter of course, recording of pixel values and comparison of brightness values may be performed for all visible apexes when machine power is increased. Note that the image generation unit 53 may determine whether to record a brightness value on the basis of a normal vector of a position corresponding to an apex in the captured image. For example, when the image generation unit 53 records a brightness value in the case where a direction of a normal vector is directed toward the image pickup unit 2, the image generation unit 53 can prevent recording of a brightness value in a position in which a disturbance can be caused such as a lateral direction. The image generation unit 53 records a sufficient number of pixel values of apexes to exclude an influence caused by an outlier.

(4-3-2) Generation of Change Texture

The image generation unit 53 generates change texture to be displayed on a surface of a change object generated by the change object generation unit 52. As texture to be displayed regarding the change object, for example, there are two kinds of texture, i.e., texture of an invisible portion such as a cross-section of a broken piece and texture of a visible portion that has originally been exposed. The image generation unit 53 generates the former texture as change texture (second surface image). Regarding the latter texture, a corresponding portion in a through image is displayed by the display control unit 6 described below.

The image generation unit 53 generates change texture by performing estimation on the basis of a portion corresponding to an exposed surface of a target object in a captured image. For example, when the change texture is generated, the image generation unit 53 may determine a single color on the basis of, for example, an average value of pixel values in a portion of the target object exposed in the captured image. A polygon in an invisible region of the change object is painted in the single color by the display control unit 6 described below. In addition, the image generation unit 53 may generate the change texture by using an image interpolation algorithm such as Inpainting. In the example illustrated in FIG. 4, a surface of the helmet 12 is visible and the inside of the helmet 12 is invisible. Therefore, in the case where, for example, the AR image 112 showing the broken helmet 12 illustrated in FIG. 1 is displayed, the image generation unit 53 averages pixel values of the surface of the helmet 12 to determine a single color as color of change texture of an invisible broken cross-section of a broken piece.

As described above, background texture and change texture are generated on the basis of images captured by the image pickup unit 2, but a technique according to the present disclosure is not limited thereto. For example, the image generation unit 53 may generate background texture and change texture on the basis of captured images captured by an external image pickup device in advance. However, considering a possibility that image pickup conditions are different, it is preferable that an image pickup unit for capturing captured images based on which background texture and change texture are generated and an image pickup unit for capturing a through image on which an AR image is overlaid be the same. Note that background texture and change texture may be generated without using captured images. For example, the image generation unit 53 may generate texture painted in an arbitrary single color or may generate texture expressing perspective on the basis of a result of sensing performed by a depth sensor (not illustrated).

(5) Display Control Unit 6

The display control unit 6 has a function of controlling the display unit 7 so that the display unit 7 performs AR display by using texture or a through image generated by the image generation unit 53. Specifically, first, the display control unit 6 dynamically determines apex positions of a background object and a change object in a through image by using posture information acquired by the posture information acquisition unit 3 and three-dimensional data acquired by the three-dimensional data acquisition unit 4. Then, the display control unit 6 displays the through image on which the AR image is overlaid while dynamically masking the through image in accordance with a state change in the change object. Control performed by the display control unit 6 is roughly classified into the following four categories: calculation of a state of a change object; generation of a dynamic drawing mask; display of background texture; and display of texture on a change object.

(5-1) Calculation of State of Change Object

The display control unit 6 calculates a state of a change object. Specifically, first, the display control unit 6 calculates a move of the change object. Then, the display control unit 6 dynamically determines apex positions of a background object and the change object in a through image by using the posture information and the three-dimensional data. For example, in the case where the state change is breakage, the display control unit 6 physically calculates positions and postures of broken pieces and determines apex positions of the background object and apex positions of each broken piece in the through image.

(5-2) Generation of Dynamic Drawing Mask

The display control unit 6 dynamically generates a drawing mask that transmits, in a through image, a region for performing AR display different from the real space in accordance with a state change in a target object. For example, in the example illustrated in FIG. 1, the helmet 12 moves backward due to an impact of collision with the ball 120, and therefore there is generated a drawing mask that transmits a background newly exposed due to the move and a region in which broken pieces of the broken helmet 12 are positioned. Note that the display control unit 6 may two-dimensionally increase such transmission regions or may apply Gaussian blur to the drawing mask. With this, a seam between an original background and texture drawn by using the drawing mask is displayed more naturally. FIG. 7 is a diagram for explaining dynamic drawing mask generation processing caused by a state change in a target object. A reference sign 610 and a reference sign 620 in FIG. 7 indicate images displayed by the display unit 7, and a reference sign 612 and a reference sign 622 indicate drawing masks dynamically generated by the display control unit 6. In the case where there is no change in states of target objects as indicated by the reference sign 610 in FIG. 7, the display control unit 6 displays a through image as it is without performing AR display and therefore generates a drawing mask having no transmission region as indicated by the reference sign 612. Meanwhile, in the case where the states of the target objects are changed as indicated by the reference sign 620 in FIG. 7, the display control unit 6 generates a drawing mask that transmits a region for displaying an AR image as indicated by the reference sign 622.

(5-3) Display of Background Texture

The display control unit 6 displays an AR image in which background texture is attached to a polygon that is in a background object hidden by a target object and is newly exposed due to a change in a state of the target object. Specifically, the display control unit 6 performs display to overlay, on a through image, an AR image in which a corresponding region in background texture is attached to a polygon newly exposed in a background object while dynamically determining apex positions of the background object in the through image with the use of posture information and three-dimensional data. At this time, the display control unit 6 may correct a brightness value or a pixel value of the background texture. For example, based on a result of comparison between distribution of brightness values recorded at the time of buffering and distribution of brightness values in a corresponding position in the through image, the display control unit 6 corrects a brightness value of the background texture so that both the brightness values become close to each other. With this, matching of the background texture with the through image is improved, and more natural AR display is realized. Hereinafter, processing for displaying background texture will be specifically described with reference to FIG. 8 to FIG. 10.

Figure 8:
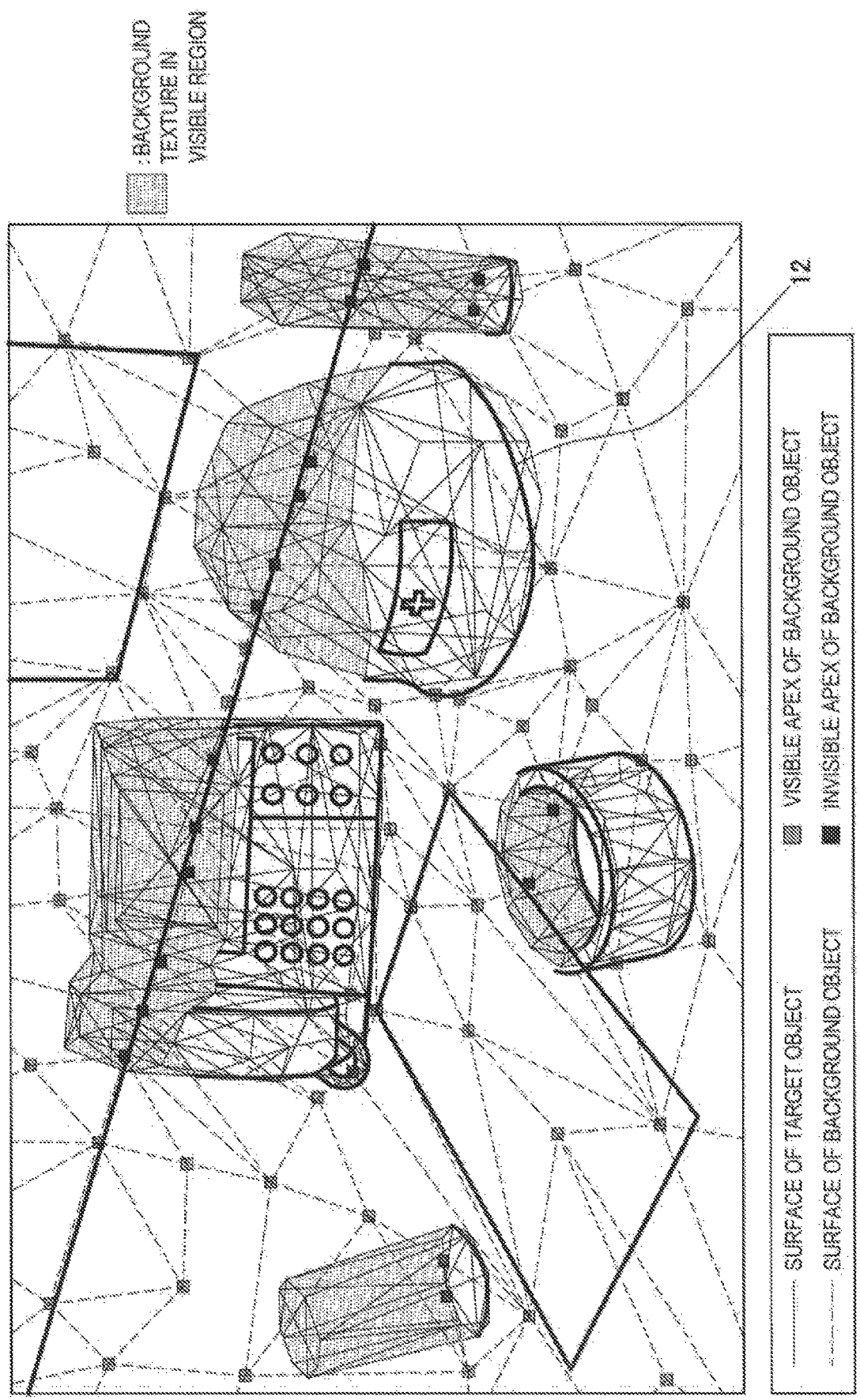
FIG. 8 is an explanatory view for explaining processing for displaying background texture.
Figure 9:
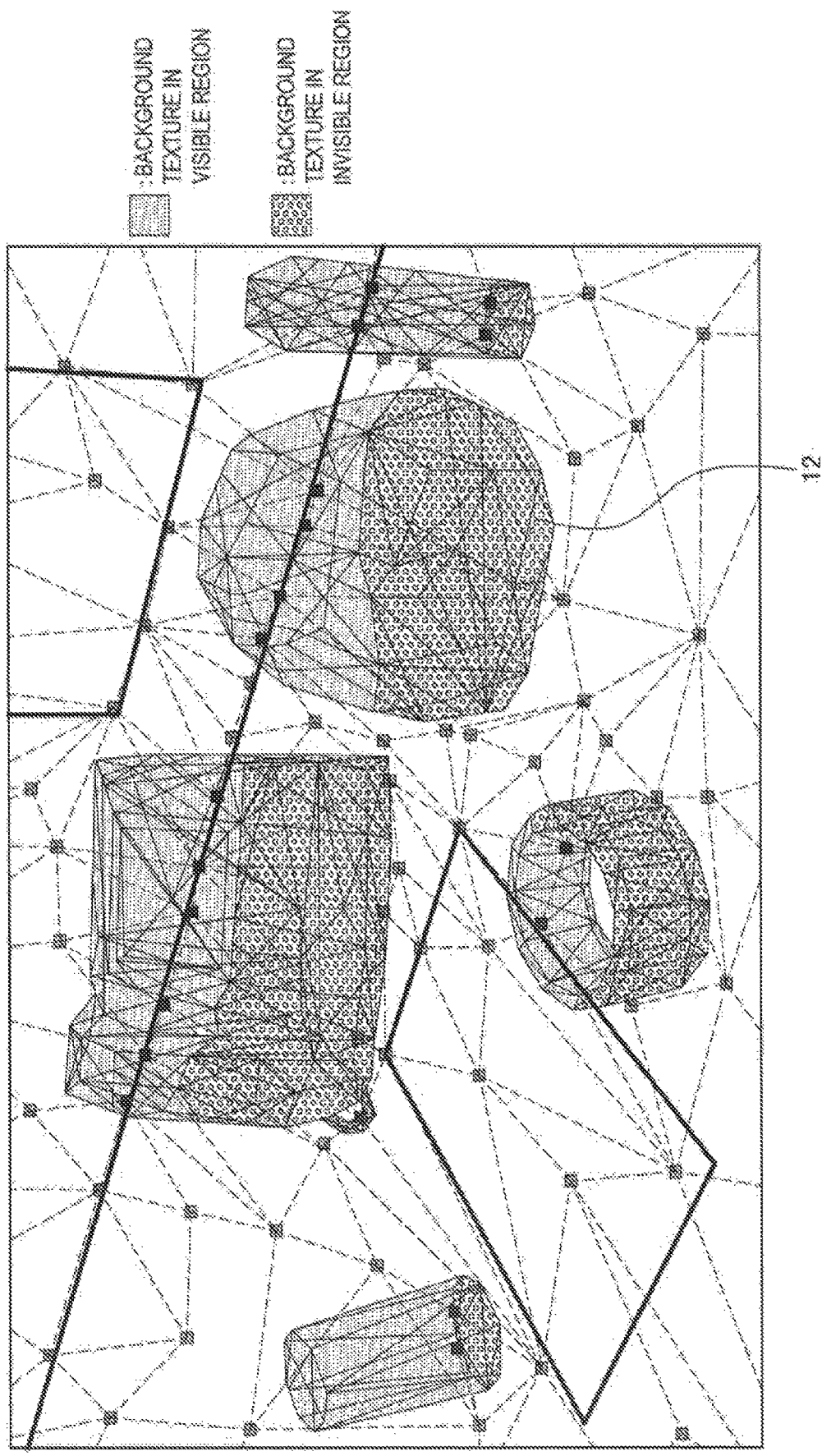
FIG. 9 is an explanatory view for explaining processing for displaying background texture.
Figure 10:
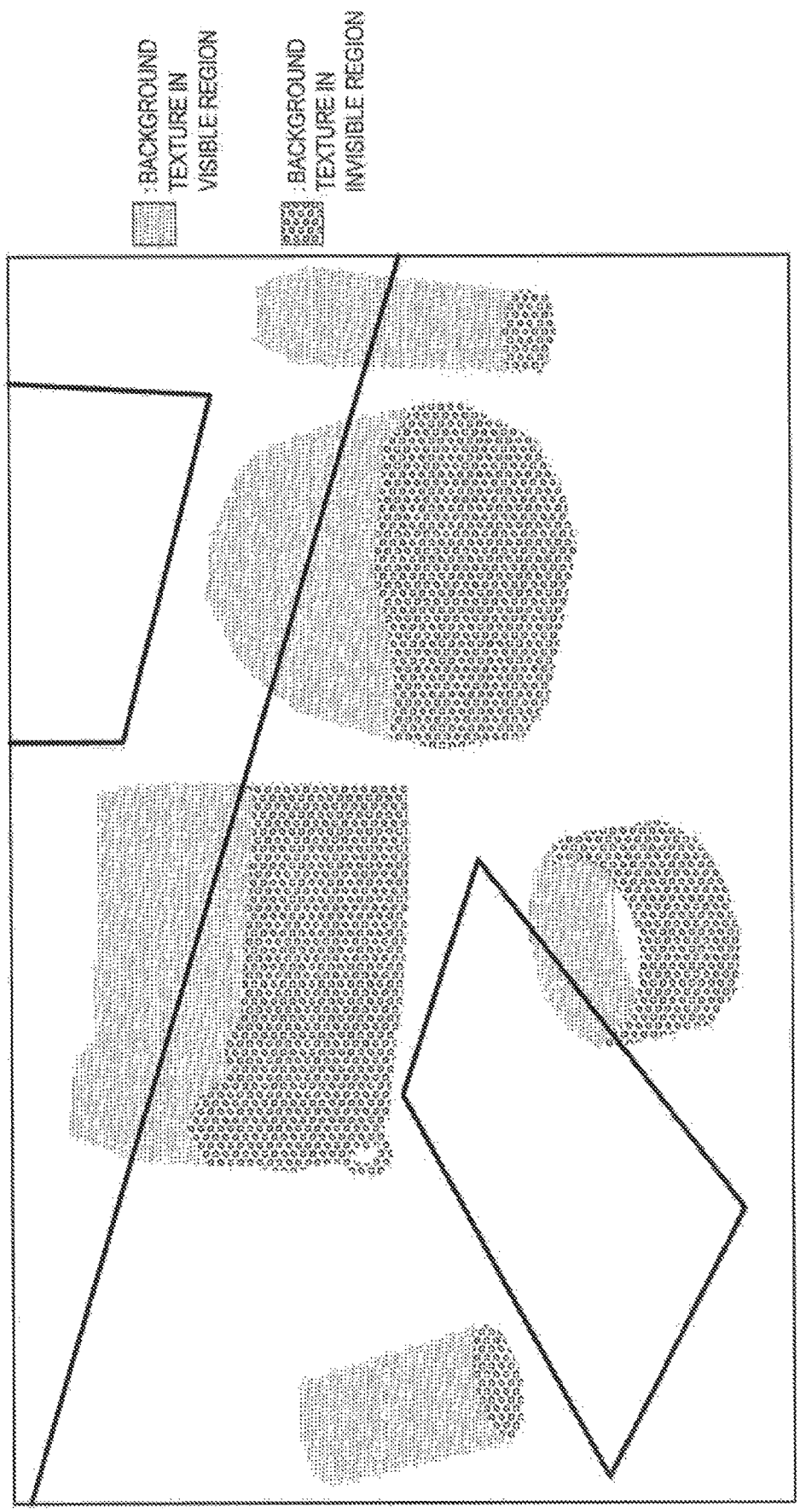
FIG. 10 is an explanatory view for explaining processing for displaying background texture.

FIG. 8 to FIG. 10 are explanatory views for explaining processing for displaying background texture. FIG. 8 to FIG. 10 illustrate, as an example, a display example where all target objects are deleted from a through image. FIG. 8 illustrates an example where background texture in a visible region is displayed in a background hidden by the target objects. As illustrated in FIG. 8, for example, in the case where a captured image captured from the back surface side of the helmet 12 is buffered, the background texture in the visible region is displayed in a region of an upper half of the helmet 12. With this, display is performed as if the upper half of the helmet 12 is transparent. FIG. 9 illustrates an example where not only the background texture in the visible region but also background texture in an invisible region is displayed in the background hidden by the target object. As illustrated in FIG. 9, for example, in the case where a captured image obtained by capturing an image of a floor surface with which the helmet 12 is in contact is not buffered, the background texture in the invisible region is displayed in a region of a lower half of the helmet 12 corresponding to the floor surface. With this, display is performed as if the helmet 12 does not exist. FIG. 10 illustrates a display example where display of three-dimensional data is deleted from FIG. 9.

(5-4) Display of Texture on Change Object

The display control unit 6 performs display by attaching texture to a surface of a change object with the use of apex positions of the change object which has been dynamically determined. As described above, as texture to be displayed regarding the change object, there are two kinds of texture, i.e., texture in an invisible portion and texture in a visible portion. Regarding the former texture, the display control unit 6 displays an AR image in which change texture generated by the image generation unit 53 is attached to a polygon that is newly exposed due to a state change in the change object. For example, in the example illustrated in FIG. 1, the display control unit 6 attaches texture painted in a single color determined by the image generation unit 53 to a polygon corresponding to a broken cross-section among polygons of each of surfaces of broken pieces. Regarding the latter texture, the display control unit 6 displays an AR image in which an image of a target object exposed in a through image is attached to a corresponding polygon in a change object. For example, in the example illustrated in FIG. 1, the display control unit 6 attaches an image of the surface of the helmet 12 exposed in the through image to a polygon corresponding to the surface of the helmet 12 among the polygons of each of the surfaces of the broken pieces. Note that the display control unit 6 may determine whether to display change texture or a part of a through image with reference to flag information set by the change object generation unit 52.

Figure 11:
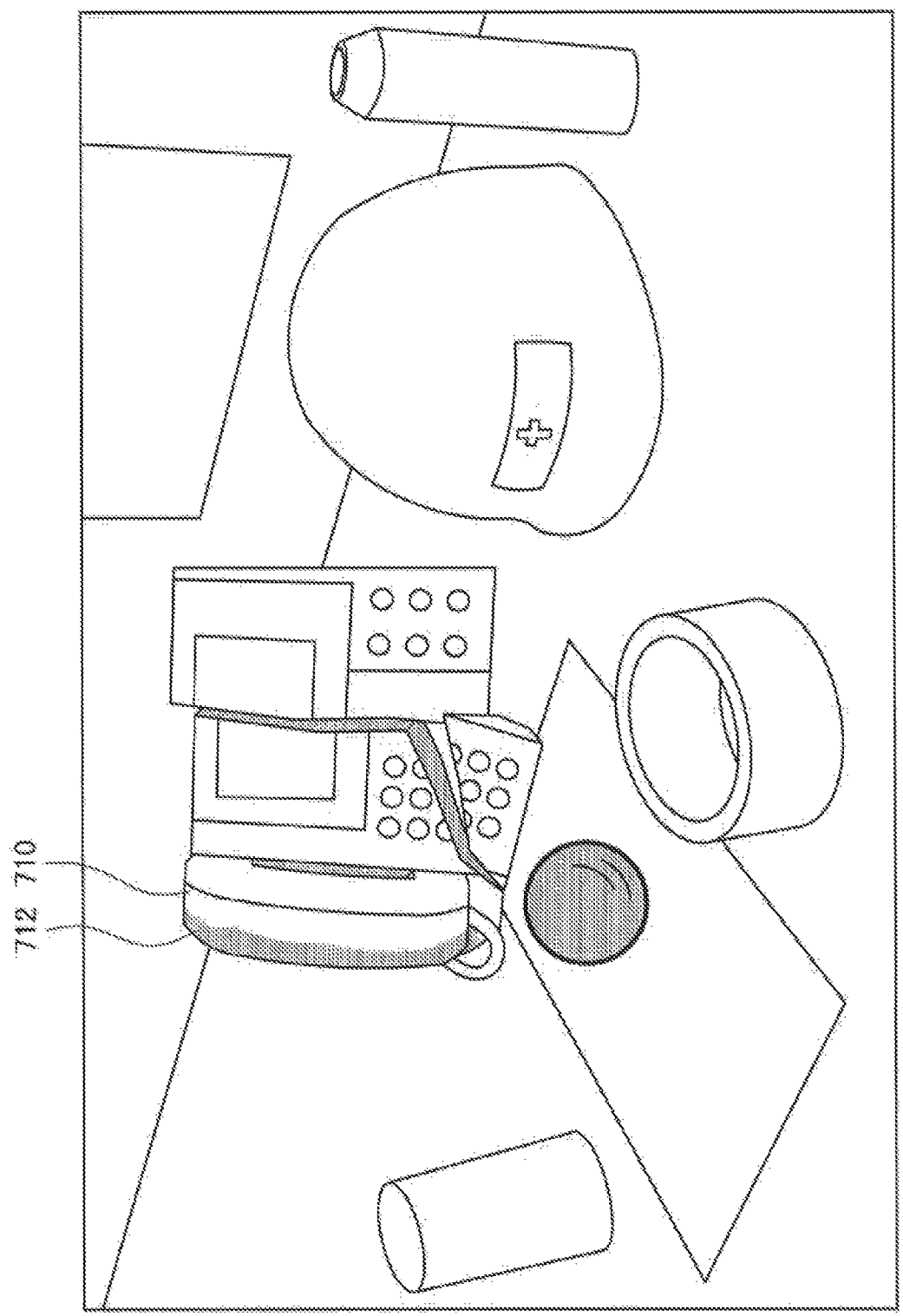
FIG. 11 illustrates an example of processing for correcting brightness of change texture.

The display control unit 6 corrects brightness in accordance with a difference between an original position of a target object and a position of a change object that is dynamically determined. For example, the display control unit 6 estimates a position of a light source on the basis of brightness distribution of a target object in a through image and calculates how to expose a change object to light from the estimated light source, thereby correcting brightness distribution of change texture and displaying the change texture. With this, the display control unit 6 can express how to naturally expose the target object to light in accordance with a change in a state of the target object such as breakage or move. FIG. 11 illustrates an example of processing for correcting brightness of change texture. As illustrated in FIG. 11, a position and an angle of a broken piece 710 of the broken telephone set 10 are changed due to breakage. Therefore, the display control unit 6 expresses a shadow by correcting a brightness value of an outer portion 712 of a receiver in the broken piece 710. The display control unit 6 can express breakage of the target object more naturally by generating a shadow at the moment of breakage. Note that the position of the light source may be a predetermined position.

(6) Display Unit 7

The display unit 7 combines a through image captured by the image pickup unit 2 and an AR image generated by the image generation unit 53 and displays the combined image on the basis of control performed by the display control unit 6. The display unit 7 is realized by, for example, a liquid crystal display (LCD) or an organic light-emitting diode (OLED). In the case where an information processing device according to this embodiment is realized as an HMD, the display unit 7 may be formed in a transparent or semitransparent through state and display an AR image in the real space displayed on the display unit 7 in the through state. In addition, the display unit 7 displays the UI for buffering a captured image having high independence, which has been described with reference to FIG. 6, on the basis of control performed by the display control unit 6.

The configuration example of the smartphone 1 according to this embodiment has been described above. Next, operation processing of the smartphone 1 according to this embodiment will be described with reference to FIG. 12 to FIG. 16.

3. OPERATION PROCESSING

Hereinafter, operation processing in an example where the smartphone 1 displays an AR image in which a target object is broken will be described as an example.

[3-1. Processing for Generating Change Object]

Figure 12:
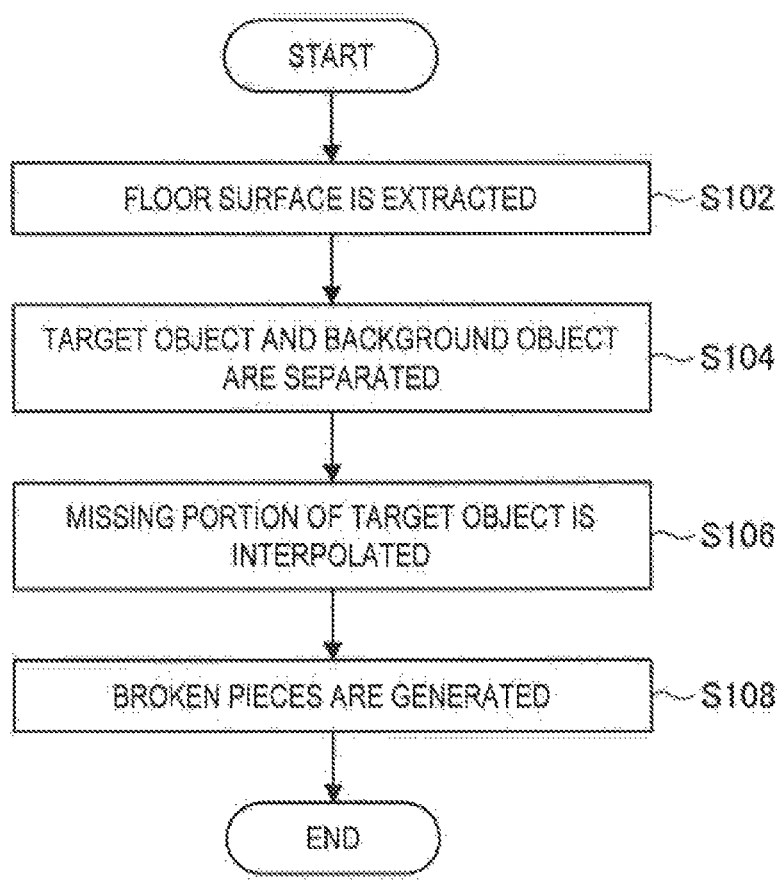
FIG. 12 is a flowchart showing an example of a flow of processing for generating a change object, which is executed in the smartphone according to this embodiment.

FIG. 12 is a flowchart showing an example of a flow of processing for generating a change object, which is executed in the smartphone 1 according to this embodiment.

As shown FIG. 12, in Step S102, the recognition unit 51 extracts a floor surface. Specifically, the recognition unit 51 extracts planes from three-dimensional data acquired by the three-dimensional data acquisition unit 4 and recognizes a plane having the largest area as the floor surface. At this time, the recognition unit 51 may recognize, as the wall surface 202, a shape group that is vertical to a floor surface and is provided in an end portion of a three-dimensional shape indicated by the three-dimensional data.

In Step S104, the recognition unit 51 separates a target object from a background object. Specifically, the recognition unit 51 recognizes, as the target object, a three-dimensional shape other than the floor surface or the wall surface, the three-dimensional shape being protruded on the floor surface and having a volume equal to or larger than a threshold. Further, among three-dimensional shapes indicated by the three-dimensional data, the recognition unit 51 recognizes a three-dimensional shape other than the target object as a background object.

In Step S106, the recognition unit 51 interpolates a missing portion of the target object. Specifically, regarding a missing portion such as a portion of the target object which has originally been in contact with the floor surface or the wall surface, the recognition unit 51 interpolates the missing portion by extending apexes around the missing portion, connecting the apexes around the missing portion with lines, or compensating a surface. Similarly, the recognition unit 51 interpolates a missing portion of a background object.

In Step S108, the change object generation unit 52 generates a change object obtained by changing a state of the target object. Specifically, the change object generation unit 52 generates a change object showing broken pieces by applying an algorithm such as Voronoi Fracture or Voronoi Shatter to the target object.

[3-2. Buffering Processing]

Figure 13:
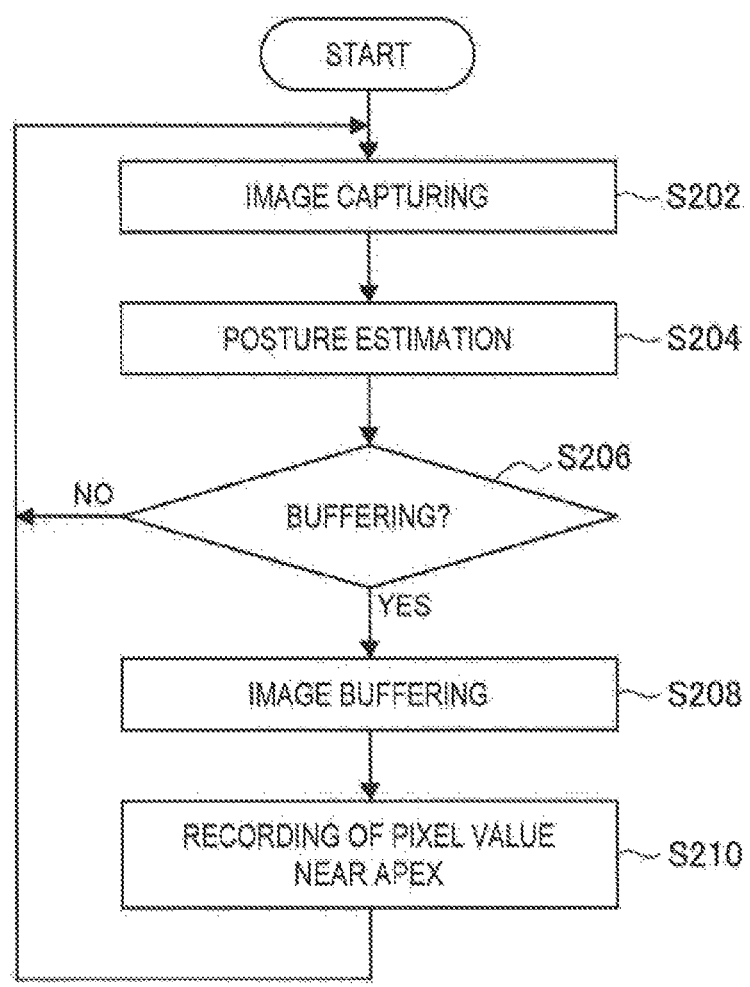
FIG. 13 is a flowchart showing an example of a flow of buffering processing, which is executed in the smartphone according to this embodiment.

FIG. 13 is a flowchart showing an example of a flow of buffering processing, which is executed in the smartphone 1 according to this embodiment.

As shown in FIG. 13, in Step S202, the image pickup unit 2 captures an image of the real space and outputs the captured image to the image generation unit 53.

In Step S204, the image generation unit 53 estimates a position and a posture of the image pickup unit 2. Specifically, the image generation unit 53 estimates which position at which angle in the real space the image pickup unit 2 has captured a captured image which is a buffering candidate with the use of posture information acquired by the posture information acquisition unit 3 and three-dimensional data acquired by the three-dimensional data acquisition unit 4 in the case where the image pickup unit 2 captures the image in Step S202.

In Step S206, the image generation unit 53 determines whether to buffer the captured image captured by the image pickup unit 2 in Step S202. Specifically, first, the image generation unit 53 determines visibility of an apex of a background object in the captured image on the basis of the position and the angle of the image pickup unit 2 in real space, which are estimated in Step S204. Then, the image generation unit 53 determines whether to perform buffering so that a captured image that has high independence and has been recently captured is preferentially buffered. With this determination on buffering, background texture is generated by using fewer buffer images that have been captured more recently, and therefore more natural AR display is realized. Note that, in the case where a captured image having higher independence than that of a buffer image that has already been buffered is newly captured, the image generation unit 53 may update contents of a buffer by replacing those buffer images.

In the case where it is determined to perform buffering (S206/YES), in Step S208, the image generation unit 53 buffers the captured image. On the contrary, in the case where it is determined not to perform buffering (S206/YES), processing returns to Step S202.

In Step S210, the image generation unit 53 records, as distribution of brightness values associated with apexes, a plurality of brightness values near positions corresponding to apexes in three-dimensional data, the positions being in a background exposed in the buffered captured image. As described above, the distribution of the brightness values recorded at this time is referred to by the display control unit 6, and a brightness value of background texture is corrected at the time of AR display. With this, more natural AR display is realized.

By repeating the processing described above, the smartphone 1 preferentially buffers a captured image that has higher independence and has been captured more recently.

[3-3. Processing for Generating Background Texture]

Figure 14:
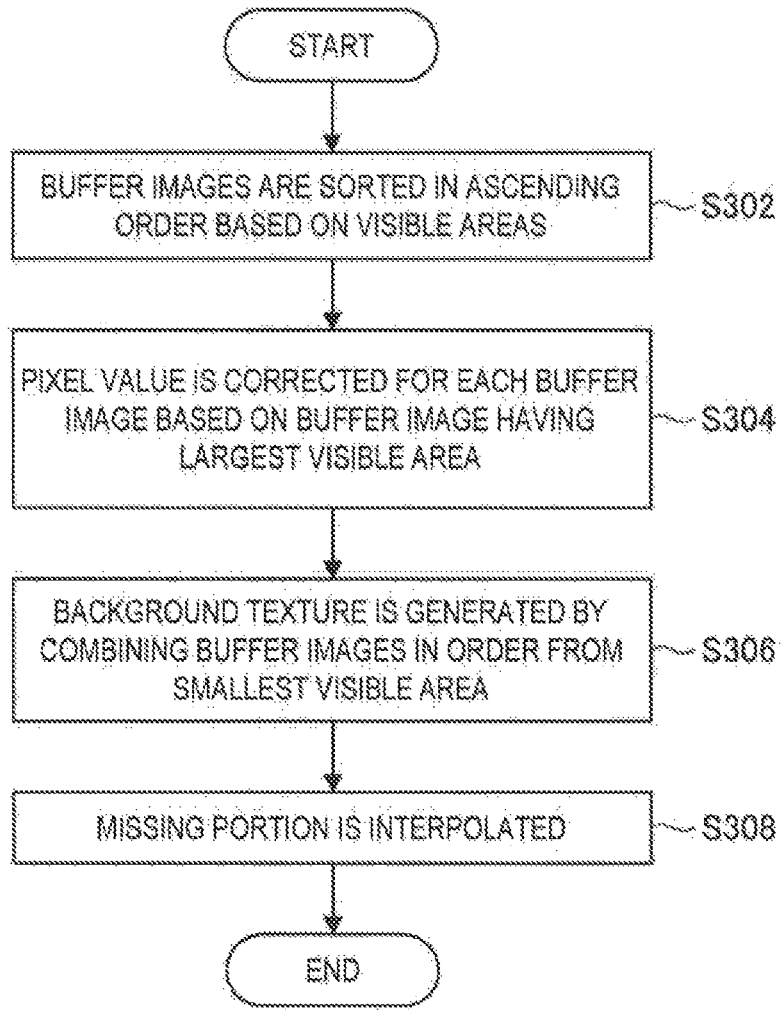
FIG. 14 is a flowchart showing an example of a flow of processing for generating background texture, which is executed in the smartphone according to this embodiment.

FIG. 14 is a flowchart showing an example of a flow of processing for generating background texture, which is executed in the smartphone 1 according to this embodiment.

As shown in FIG. 14, in Step S302, the image generation unit 53 sorts buffer images on the basis of a visible area in ascending order, i.e., in order from the smallest visible area (in order from the fewest visible apexes). The image generation unit 53 combines the buffer images in the sorted order in Step S306 described below, and consequently the image generation unit 53 preferentially combines buffer images having a large visible area.

In Step S304, the image generation unit 53 corrects a pixel value for each buffer image on the basis of a buffer image having the largest visible area. This prevents generation of unnatural background texture in which pixel values are largely different around a seam.

In Step S306, the image generation unit 53 generates background texture by combining the buffer images in the order sorted in Step S302, i.e., in the order from the smallest visible area. Specifically, the image generation unit 53 draws the buffer images by overlapping the buffer images in the order from the smallest visible area and draws a buffer image having the largest visible area at last. Overlapped portions of the buffer images drawn earlier are overwritten by the buffer images drawn later, and therefore, a drawing region is smaller as the visible area is smaller. Accordingly, the image generation unit 53 performs combination so that a region obtained by combining captured images having a large visible area occupies a larger region in the background texture. The image generation unit 53 may express a seam more naturally by combining the buffer images with the use of a Gaussian blur mask.

In Step S308, the image generation unit 53 interpolates a missing portion of the generated background texture. Specifically, the image generation unit 53 interpolates a region invisible in all the buffer images, such as a floor surface that is in contact with a target object, by using an image interpolation algorithm such as Inpainting. With the processing described above, the smartphone 1 generates an image of background texture.

[3-4. Processing for Generating Change Texture]

Figure 15:
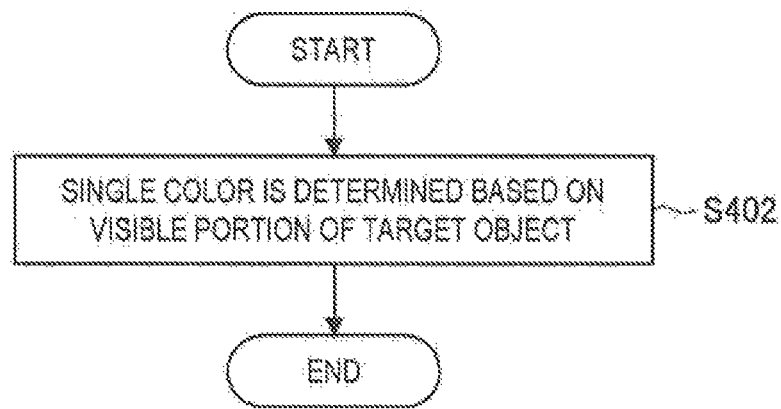
FIG. 15 is a flowchart showing an example of a flow of processing for generating change texture, which is executed in the smartphone according to this embodiment.

FIG. 15 is a flowchart showing an example of a flow of processing for generating change texture, which is executed in the smartphone 1 according to this embodiment.

As shown in FIG. 15, in Step S402, the image generation unit 53 determines a single color to be used for change texture by the display control unit 6 on the basis of a visible portion of a target object. In addition, the image generation unit 53 may generate the change texture by using an image interpolation algorithm such as Inpainting.

With the processing described above, the smartphone 1 generates change texture. The processing described so far in [3-1. Processing for Generating Change Object] to [3-4. Processing for Generating Change Texture] is executed in advance as advance preparations or is executed immediately before processing described in the following [3-5. AR Display Processing]. This reduces a difference between a time at which an image based on which various kinds of texture is generated is captured and a time at which a through image is captured. Therefore, more natural AR display is realized.

[3-5. AR Display Processing]

FIG. 16 is a flowchart showing an example of a flow of AR display processing, which is executed in the smartphone 1 according to this embodiment. In FIG. 16, there will be specifically described an example where AR display showing breakage of a target object illustrated in FIG. 1 is performed.

As shown in FIG. 16, in Step S502, the display control unit 6 acquires a through image captured by the image pickup unit 2 in real time and posture information acquired by the posture information acquisition unit 3 in real time.

In Step S504, the display control unit 6 calculates positions and postures of broken pieces. Specifically, the display control unit 6 physically calculates motion of the broken pieces and calculates current positions of respective apexes of a background object and the broken pieces in the through image with the use of the posture information acquired in Step S502 and three-dimensional data.

In Step S506, the display control unit 6 dynamically generates a drawing mask in accordance with a breakage situation. Specifically, the display control unit 6 generates, by using the apex positions of the broken pieces determined in Step S504, a drawing mask that transmits a region for displaying the broken pieces and a region for displaying background texture. Note that the display control unit 6 two-dimensionally increases transmission regions or applies Gaussian blur to the drawing mask, and therefore a seam between an original background and texture drawn by using the drawing mask is displayed more naturally.

In Step S508, the display control unit 6 computes a parameter for correcting brightness. Specifically, based on a result of comparison between distribution of brightness values recorded at the time of buffering and distribution of brightness values in a corresponding position in the through image, the display control unit 6 corrects a brightness value of the background texture so that both the brightness values become close to each other.

In Step S510, the display control unit 6 draws the through image captured by the image pickup unit 2 in real time. Change texture and the background texture are drawn to be overlaid in subsequent processing, and thus an AR image is overlaid on the through image.

In Step S512, the display control unit 6 fills a depth buffer with all objects such as a change object and a background object.

In Step S514, the display control unit 6 draws the background texture on the basis of the drawing mask generated in Step S506. Specifically, with reference to the depth buffer, the display control unit 6 draws the background texture by attaching a corresponding region in the background texture to a polygon included in a region of the background object transmitted in the drawing mask.

In Step S516, the display control unit 6 draws broken pieces. Specifically, with reference to the depth buffer, the display control unit 6 paints a polygon of, for example, a cross-section of a broken piece that is newly exposed due to a state change among the broken pieces in a single color determined by the image generation unit 53. Further, the display control unit 6 draws an image of a surface of a target object which is exposed in the through image in a corresponding polygon of the broken piece.

In Step S518, the display control unit 6 performs various kinds of postprocessing. For example, the display control unit 6 draws other virtual objects or estimates a position of a light source to draw a shadow.

With the processing described above, the smartphone 1 performs display so as to overlay, on a through image, an AR image expressing a state in which a target object existing in the real space is broken.

4. CONCLUSION

An embodiment of a technique according to the present disclosure has been described so far in detail with reference to FIG. 1 to FIG. 16. According to the embodiment described above, expression that changes an object existing in the real space is provided, and therefore it is possible to give a user a stronger impression that a real world is enhanced by using the AR technique. For example, the smartphone 1 according to this embodiment can naturally express breakage of an object existing in the real world.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, in the embodiment described above, an example where the image pickup unit 2, the posture information acquisition unit 3, the three-dimensional data acquisition unit 4, the control unit 5, the display control unit 6, and the display unit 7 are formed in the same device as the smartphone 1 has been described, but this technique is not limited to this example. For example, the image pickup unit 2 may be included in an external device and the smartphone 1 may perform the above AR display on the basis of a captured image acquired from an external device. In addition, for example, a server in a cloud may include the three-dimensional data acquisition unit 4, the control unit 5, and the display control unit 6, and a client device connected to the server via a network may include the image pickup unit 2, the posture information acquisition unit 3, and the display unit 7. In this case, the client device may send a captured image and posture information to the server and display an AR image in accordance with various kinds of calculation and control performed by the server.

In the embodiment described above, an example where a state change in a target object is breakage has been described, but the present disclosure is not limited to this example. For example, the smartphone 1 may express increase/decrease in a size and move of the target object. In the case where move of the target object is expressed, a technique according to the present disclosure can be applied to, for example, a remodeling simulator for virtually moving a desk or a chair.

The series of control processes carried out by each apparatus described in the present specification may be realized by software, hardware, or a combination of software and hardware. Programs included such software may be stored in advance for example on a storage medium (non-transitory medium) provided inside or outside each of the apparatus. As one example, during execution, such programs are written into RAM (Random Access Memory) and executed by a processor such as a CPU.

In addition, the effects described in the present specification are merely illustrative and demonstrative, and not limitative. In other words, the technology according to the present disclosure can exhibit other effects that are evident to those skilled in the art along with or instead of the effects based on the present specification. Additionally, the present technology may also be configured as below.

(1)

An information processing device, including:

a recognition unit configured to recognize an object included in a real space so as to distinguish the object from a background on the basis of three-dimensional data of the real space in order to generate a virtual object image obtained by changing a state of the object.

(2)

The information processing device according to (1), further including:

an image generation unit configured to generate the object image of the object recognized by the recognition unit.

(3)

The information processing device according to (2), further including:

a change object generation unit configured to generate a virtual change object obtained by changing the state of the object; and a display control unit configured to control a display unit so that the display unit displays the object image generated by the image generation unit on a surface of the change object.

(4)

The information processing device according to (3), wherein the image generation unit generates, on the basis of a portion corresponding to an exposed surface of the object in a captured image obtained by capturing an image of the real space, a second surface image obtained by estimating a surface of the object hidden in the captured image, and wherein the display control unit displays the object image in which the second surface image is attached to a region of the change object which is newly exposed due to the change.

(5)

The information processing device according to (3) or (4), wherein the display control unit displays the object image obtained by attaching an image of a target object exposed in a through image obtained by capturing an image of the real space in real time to a corresponding region of the change object.

(6)

The information processing device according to any one of (3) to (5), wherein the display control unit displays the object image by estimating a position of a light source in the real space and correcting brightness of the object image in accordance with the estimated position of the light source.

(7)

The information processing device according to any one of (3) to (6), wherein the display control unit displays the object image obtained by attaching a first surface image to a portion that is in the background hidden by the object and is newly exposed due to a change in the state of the object.

(8)

The information processing device according to (7), wherein the image generation unit generates the first surface image by combining the backgrounds exposed in one or more captured images obtained by capturing images of the real space.

(9)

The information processing device according to (8), wherein, among the captured images obtained by capturing images of the real space, the image generation unit preferentially buffers the captured image that has a small overlapped portion in which the background is hidden by the object and has been captured recently, and uses the buffered captured image to generate the first surface image.

(10)

The information processing device according to (9), wherein the image generation unit determines whether to buffer a captured image on the basis of posture information indicating a position and an angle of an image pickup unit that has captured the captured image and the three-dimensional data.

(11)

The information processing device according to (9) or (10), wherein, in order that a whole region of a portion corresponding to the background among surfaces of a solid body indicated by the three-dimensional data is exposed in at least one of the one or more buffered captured images, the display control unit performs display for leading an image pickup posture of an image pickup unit configured to capture a captured image that the image generation unit uses to generate an image.

(12)

The information processing device according to any one of (9) to (11), wherein the display control unit corrects a brightness value of the first surface image on the basis of a result of comparison between a brightness value near a position corresponding to an apex in the three-dimensional data, the position being in the background exposed in the buffered captured images, and a brightness value in a corresponding position in a through image obtained by capturing an image of the real space in real time.

(13)

The information processing device according to any one of (3) to (12), further including:

an image pickup unit configured to capture a captured image that the image generation unit uses to generate an image, wherein the display control unit combines a captured image captured in real time by the image pickup unit and an image generated by the image generation unit, and displays the combined image.

(14)

The information processing device according to any one of (3) to (13), wherein the background recognized to be distinguished by the recognition unit is excluded from targets to be used for generating the change objects with the change object generation unit.

(15)

The information processing device according to any one of (1) to (14), wherein the recognition unit extracts a floor surface from the three-dimensional data and recognizes, as the object, a portion protruded on the extracted floor surface and recognizes, as the background, a portion other than the object.

(16)

The information processing device according to (15), wherein the recognition unit extracts the floor surface on the basis of a direction of gravity.

(17)

The information processing device according to any one of (1) to (16), wherein a change in the state includes breakage of the object.

(18)

An information processing method, including:

recognizing, by a processor, an object included in a real space so as to distinguish the object from a background on the basis of three-dimensional data of the real space in order to generate a virtual object image obtained by changing a state of the object.

(19)

A program for causing a computer to function as:

a recognition unit configured to recognize an object included in a real space so as to distinguish the object from a background on the basis of three-dimensional data of the real space in order to generate a virtual object image obtained by changing a state of the object.

REFERENCE SIGNS LIST 1 smartphone
2 image pickup unit
3 posture information acquisition unit
4 three-dimensional data acquisition unit
5 control unit
51 recognition unit
52 change object generation unit
53 image generation unit
6 display control unit
7 display unit
10 telephone set
11 packing tape
12 helmet
13 beverage can
14 spray can

What is claimed is:

1. An information processing apparatus, comprising:
   circuitry configured to:
   determine a change in a state of an object recognized in a real space based on an interaction of the object with a virtual object;
   generate a virtual object image based on the determined change in the state of the object recognized in the real space;
   generate an object image of the object;
   control display of the object image based on:
   an estimation of a position of a light source in the real space; and
   a correction of brightness of the virtual object image based on the estimated position of the light source; and
   control display of the virtual object image on the object image.

2. The information processing apparatus according to claim 1, wherein the circuitry is further configured to:
   recognize the object included in the real space to distinguish the object from a background based on three-dimensional data of the real space; and
   generate the object image based on the recognized object.

3. The information processing apparatus according to claim 1, wherein the circuitry is further configured to:
   obtain a captured image by capture of an image of the real space;
   generate, based on a portion corresponding to an exposed surface of the object in the captured image, a surface image obtained by an estimation of a surface of the object hidden in the captured image; and
   control the display of the object image in which the surface image is attached to a region of the virtual object image,
   wherein the region of the virtual object image is newly exposed due to the change in the state of the object.

4. The information processing apparatus according to claim 1, wherein the circuitry is further configured to:
   obtain a through image by capture of an image of the real space in real time; and
   control the display of the object image obtained by attachment of an image of a target object exposed in the through image to a corresponding region of the virtual object image.

5. The information processing apparatus according to claim 1, wherein the circuitry is further configured to:
   determine a portion of the object that is in a background hidden by the object in the object image, wherein the portion of the object is newly exposed due to the change in the state of the object; and
   display the object image obtained by attachment of a surface image to the determined portion in the background hidden by the object in the object image.

6. The information processing apparatus according to claim 5, wherein the circuitry is further configured to generate the surface image by combination of backgrounds exposed in a plurality of captured images of the real space.

7. The information processing apparatus according to claim 6, wherein the circuitry is further configured to:
preferentially buffer a captured image among the plurality of captured images that has an overlapped portion in which the background is hidden by the object and has been captured recently; and
generate the surface image based on the buffered captured image.

8. The information processing apparatus according to claim 7, wherein the circuitry is further configured to determine whether to buffer the captured image based on posture information indicating a position and an angle of an image pickup unit that has captured the captured image, and three-dimensional data of the real space.

9. The information processing apparatus according to claim 7, wherein the circuitry is further configured to control display for leading an image pickup posture of an image pickup unit configured to capture the captured image.

10. The information processing apparatus according to claim 7, wherein the circuitry is further configured to correct a brightness value of the surface image based on a result of comparison between:
a brightness value, near a position corresponding to an apex in three-dimensional data of the real space, in each captured image among the plurality of captured images, wherein the position, corresponding to the apex, is included in the background of the buffered captured image, and
a brightness value, in a corresponding position in a through image obtained by capture of an image of the real space in real time, in each captured image among the plurality of captured images.

11. The information processing apparatus according to claim 1, further comprising:
an image pickup unit configured to capture a captured image that the circuitry uses to generate an image, wherein the circuitry is further configured to:
combine the captured image captured in real time by the image pickup unit and the image generated by the circuitry to generate a combined image; and
display the combined image.

12. The information processing apparatus according to claim 1, wherein the determined change in the state comprises breakage of the object.

13. An information processing method, comprising:
determining, by circuitry, a change in a state of an object recognized in a real space based on an interaction of the object with a virtual object;
generating, by the circuitry, a virtual object image based on the determined change in the state of the object recognized in the real space;
generating, by the circuitry, an object image of the object;
controlling, by the circuitry, display of the object image based on:
an estimation of a position of a light source in the real space; and
a correction of brightness of the virtual object image based on the estimated position of the light source; and
controlling, by the circuitry, display of the virtual object image on the object image.

14. A non-transitory computer-readable medium, having stored thereon computer-executable instructions, which when executed by a processor, cause the processor to execute operations, the operations comprising:
determining a change in a state of an object recognized in a real space based on an interaction of the object with a virtual object;
generating a virtual object image based on the determined change in the state of the object recognized in the real space;
generating an object image of the object;
controlling display of the object image based on:
an estimation of a position of a light source in the real space; and
a correction of brightness of the virtual object image based on the estimated position of the light source; and
controlling display of the virtual object image on the object image.

15. The information processing apparatus according to claim 1, wherein the determined change in the state of the object comprises a movement of the object.

16. An information processing apparatus, comprising:
circuitry configured to:
determine a change in a state of an object recognized in a real space;
generate a virtual object image based on the determined change in the state of the object recognized in the real space;
generate an object image of the object;
obtain a captured image by capture of an image of the real space;
generate, based on a portion corresponding to an exposed surface of the object in the captured image, a surface image obtained by an estimation of a surface of the object hidden in the captured image; and
control display of the object image in which the surface image is attached to a region of the virtual object image, wherein the region of the virtual object image is newly exposed due to the change in the state of the object.

* * * * *